(12) United States Patent
Haley

(10) Patent No.: US 12,050,874 B2
(45) Date of Patent: Jul. 30, 2024

(54) SYSTEM FOR KNOWLEDGE ACQUISITION

(71) Applicant: Paul V. Haley, Fernandina Beach, FL (US)

(72) Inventor: Paul V. Haley, Fernandina Beach, FL (US)

(*) Notice: Subject to any disclaimer, the term of this patent is extended or adjusted under 35 U.S.C. 154(b) by 0 days.

(21) Appl. No.: 17/643,977

(22) Filed: Dec. 13, 2021

(65) Prior Publication Data

US 2022/0269865 A1     Aug. 25, 2022

Related U.S. Application Data

(62) Division of application No. 16/599,401, filed on Oct. 11, 2019, now Pat. No. 11,222,181, which is a division of application No. 14/889,004, filed as application No. PCT/US2014/037156 on May 7, 2014, now Pat. No. 10,452,779.

(60) Provisional application No. 61/820,350, filed on May 7, 2013.

(51) Int. Cl.
| | | |
|---|---|---|
| G10L 15/18 | (2013.01) | |
| G06F 40/205 | (2020.01) | |
| G06F 40/284 | (2020.01) | |
| G06F 40/30 | (2020.01) | |
| G06F 40/40 | (2020.01) | |

(52) U.S. Cl.
CPC ............ *G06F 40/30* (2020.01); *G06F 40/205* (2020.01); *G06F 40/284* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 5,864,844 A * | 1/1999 | James | G09B 5/06 434/167 |
| 6,745,161 B1 | 6/2004 | Arnold et al. | |
| 7,313,515 B2 | 12/2007 | Crouch et al. | |
| 7,376,552 B2 | 5/2008 | Hander et al. | |
| 9,460,075 B2 * | 10/2016 | Mungi | G06F 40/211 |
| 9,465,833 B2 * | 10/2016 | Aravamudan | G06F 16/335 |
| 9,703,861 B2 | 7/2017 | Brown et al. | |
| 9,852,136 B2 * | 12/2017 | Venkataraman | G06F 16/48 |
| 2001/0053968 A1 | 12/2001 | Galitsky et al. | |
| 2003/0040901 A1 * | 2/2003 | Wang | G06F 40/30 704/4 |
| 2007/0250305 A1 | 10/2007 | Maxwell, III | |
| 2008/0097748 A1 * | 4/2008 | Haley | G06F 40/30 704/9 |
| 2011/0125734 A1 | 5/2011 | Duboue et al. | |
| 2012/0078888 A1 | 3/2012 | Brown et al. | |

(Continued)

*Primary Examiner* — Seong-Ah A Shin
(74) *Attorney, Agent, or Firm* — Philip E. Levy; Eckert Seamans Cherin & Mellott, LLC

(57) ABSTRACT

A system and method that translates sentences of natural language text into sets of axioms of formal logic that are consistent with parses resulting from NLP and acquired constrains as they accumulate. The system and method further present these axioms so as to facilitate further disambiguation of such sentences and produces axioms of formal logic suitable for processing by automated reasoning technologies, such as first-order or description logic suitable for processing by various reasoning algorithms, such as logic programs, inference engines, theorem provers, and rule-based systems.

17 Claims, 14 Drawing Sheets

(56) References Cited

U.S. PATENT DOCUMENTS

| | | | |
|---|---|---|---|
| 2014/0067379 A1* | 3/2014 | Kim | G06F 40/232 |
| | | | 704/9 |
| 2014/0349783 A1* | 11/2014 | Haley | A63B 57/50 |
| | | | 473/406 |
| 2015/0154173 A1* | 6/2015 | Kim | G06F 40/268 |
| | | | 704/9 |
| 2017/0140755 A1 | 5/2017 | Andreas et al. | |
| 2017/0193088 A1 | 7/2017 | Boguraev et al. | |
| 2018/0189867 A1 | 7/2018 | Takiel | |
| 2018/0336183 A1 | 11/2018 | Lee et al. | |
| 2019/0236204 A1 | 8/2019 | Canim et al. | |
| 2019/0237068 A1 | 8/2019 | Canim et al. | |

* cited by examiner

SYSTEM FOR KNOWLEDGE ACQUISITION

CROSS-REFERENCE TO RELATED APPLICATIONS

This application is a divisional of and claims priority under 35 U.S.C. § 119(e) from U.S. Divisional patent application Ser. No. 16/599,401, filed on Oct. 11, 2019, entitled "System For Knowledge Acquisition", which claimed priority from U.S. patent application Ser. No. 14/889,004, filed on Nov. 4, 2015, entitled "System For Knowledge Acquisition" (now U.S. Pat. No. 10,452,779, issued on Oct. 22, 2019), which is a U.S. National Stage Application of PCT/US2014/037156, filed May 7, 2014, which claimed priority from U.S. Provisional Patent Application No. 61/820,350, filed on May 7, 2013, entitled "A System For World-Wide Knowledge Acquisition", the contents of which are incorporated herein by reference in their entirety.

BACKGROUND OF THE INVENTION

1. Field of the Invention

The present invention pertains to systems and method for increasing the semantic and logical precision of information extracted from natural language text.

2. Description of the Related Art

Treebanks

Stand-off annotation is commonly used for annotating sentences with lexical and syntactic structure for use in the development of natural language processing (NLP) systems. Repositories of such annotation typically annotate words within sentences by part of speech and constituents of sentences as parse trees where leaves of such trees are words tagged with their part of speech and internal nodes of such trees are annotated with a classification of their syntactic function, such as any of various types of phrases or clauses. Consequently, such repositories of annotations are commonly called "treebanks". The Penn Treebank, for example, annotates words with one of several dozen part of speech tags, phrases with one of a couple dozen phrase tags, and clauses with one of several clause tags.

Treebanks consist primarily of lexical and syntactic (i.e., word, phrase, clause) tags and syntactic structure (i.e., phrase and clausal structure as in parse trees). Treebanks typically contain little or no semantic annotation.

Treebanks are typically constructed by linguists who typically use software tools to manually annotate natural language text with tags that specify lexical and syntactic details of fragments of the text without regard to any particular grammar or NLP system or technique.

Discriminatory Treebanking

In cases where a specific NLP technique is adopted for purposes of treebanking, a technique known as discriminatory treebanking may be employed. Discriminatory treebanking uses the output of an NLP system which implements the adopted technique in formulating a set of choices which discriminate between the set of parses obtained from the NLP system for any input fragment of text.

The set of discriminants presented as choices in discriminatory treebanking may include any or all of the lexical, syntactic, and semantic information produced by the NLP system. The number of discriminants may be many times the number of words, phrases, or clauses in the input fragment of text, however. The number of lexical discriminates increases with the size of the vocabulary and the number of lexical features considered by the NLP system. The number of syntactic discriminants increases geometrically with the number of lexical discriminants as well as geometrically in the length of the input fragment of text and with the breadth of coverage or number of non-terminals in the grammar used in the NLP system. The number of semantic discriminants increases in proportion to the number word senses or ontology concepts and how they are related to the lexical or syntactic terminals or non-terminals used in the NLP system.

Since the number of syntactic discriminants that would otherwise be presented for disambiguation is combinatoric in the size of the vocabulary and coverage of the grammar, prior approaches to discriminatory treebanking have been limited to small vocabulary applications with narrow-coverage grammars or fine-grained linguistic or semantic features with little or no discrimination among syntactic or semantic structural alternatives, such as phrase or clausal ambiguities.

Each of the prior approaches to discriminatory treebanking falls short of enabling large scale acquisition of knowledge from natural language. In the first case, limitations on vocabulary and grammatical coverage effectively precludes the use of such prior discriminatory treebanking approaches on uncontrolled natural language. In the second case, fine-grained features lacking discrimination among syntactic or semantic structural alternatives (e.g., parse trees or logical atoms) limits the potential user community to those educated in formal linguistics and familiar with the technical details of the underlying NLP system. Moreover, prior feature-based approaches commonly yield scores if not hundreds of discriminants which lack context due to their fine granularity, making discrimination a more error-prone process limited to expert users who effectively search for an acceptably discriminatory path through difficult choices among many alternatives.

Limitations of Discriminatory Treebanking

Discriminatory treebanking discriminates among the set of parses provided by an underlying NLP system with the objective of determining the correct interpretation of the input text. The process of discriminatory disambiguation begins with obtaining the full set of parses from the underlying NLP system. Unfortunately, for many natural texts, the ambiguity of sentences can produce hundreds or thousands of parses when a large vocabulary, broad coverage grammar is used, as required for uncontrolled natural language text. In the case of certain NLP systems which are not constrained by a grammar, such as statistical dependency parsers, the number of possible parsers is exorbitant. Consequently, in each case, a limit on the number of parses considered is somewhat arbitrarily imposed. In the event that the correct parse is not ranked or otherwise returned within such a limited result set, discriminatory treebanking will fail. In practice, this limit is set fairly low for various reasons, including the time and space required by the NLP system and to process the results into discriminants and render them in the discriminatory user interface. Without such limits, the number of choices presented would be overwhelming in many cases and possibly impractical in the case of NLP systems such as statistical dependency parsers.

In the case of NLP systems that require lexical entries for words to exist in order to produce parses, unknown words or missing entries for certain parts of speech or argument structure are another common cause of failure in discriminatory treebanking. The set of possible parses will simply not contain parses for a word not previously known to have the part of speech or valence required by such an NLP system in order to produce the desired parse.

The parsers of most NLP systems are limited to accepting a total order of tokens from the input text. In natural text, however, there is ambiguity in how to segment text into tokens. Thus, another cause of discriminatory failure arises when the input sequence of tokens is not as required in order to produce the desired parse. In such cases, there is no discriminant for the overlooked token. Moreover, some approaches involve tagging tokens with a single part of speech before parsing. When the assigned part of speech is not as required in order to produce the desired parse, another case of discriminatory failure occurs.

Supporting the full-generality of a partially ordered lattice of tokens, each with possibly many parts of speech, increases the negative effects of limiting the number of parses retrieved from NLP systems, increases the computational burdens of parsing such that on-line NLP becomes impractical, and the number of discriminants becomes overwhelming for large vocabulary, broad coverage processing of natural language text.

Semantic Disambiguation

Treebanking tools are focused primarily upon annotating and, where supported by an NLP system, disambiguating the lexical and syntactic aspects of sentences. Treebanking tools largely ignore semantic and logical precision.

Treebanking tools that are supported by an NLP system may go further towards annotating some of the semantic and logical aspects of sentences but their support for such aspects are limited to and by the underlying NLP system. For example, the lexical annotations are limited to the lexical entries of the underlying NLP system. Similarly, the semantic aspects are limited to the semantically and logically under-specified representations provided by some NLP systems, such as dependencies or minimal recursion semantics.

Underspecified Quantification

Parses resulting from NLP systems do not produce enough information to directly obtain a formal semantics of English. In particular, most NLP systems do not even consider quantification and few NLP systems handle quantification sufficiently for the purpose of obtaining axioms of formal logic from natural language.

Lexicalized grammars, in which a richer description of lexical entries (e.g., words) are processed by the underlying NLP system, typically produce some semantic information, including underspecified quantification. Probabilistic context-free grammars resulting from statistical NLP produce phrase structure (i.e., parse) trees, but no information about logical quantifiers or their scope. Additional processing of parse trees may provide dependency structures, as produced by dependency grammars. Dependency grammars typically provide little or no direct information concerning quantification, but may be further processed to produce some constraints on the relative scope of quantifiers. In all cases, however, the resulting logic remains underspecified with regard to quantification, both in terms of the quantifier and its scope.

Quantifier Ambiguity

Most quantifications resulting from NLP are underspecified in several aspects. From a classical logic the standpoint, the most significant ambiguity is whether a quantification is existential or universal in nature. There are many other aspects of quantification and it arises in natural language, however, and most of them are typically overlooked. One such aspect is whether the universal should be interpreted as being implicative with or without implied existential quantification of its restricting or binding formulation. Another aspect is whether the quantifier is first- or higher-order over individuals, types, or sets. Another aspect is whether the quantifier is singular or plural. Another aspect is polarity, such as negative with respect to universal or existential. Another aspect is whether the quantifier is defeasible. For example, generalized quantifiers for determiners such as 'most' or 'typical' may be treated as universal quantification in defeasible logic. Similarly, generalized quantifiers for 'few' or quantifiers for ontological promiscuity introduced for adverbials or adjectives, such as 'rarely' or 'unusual', may be treated as negations applied to defeasible quantifiers, such as corresponding to the negation of a defeasible existential or universal.

Scope Ambiguity

Even after complete disambiguation, the logical ambiguity of most sentences is extreme. Considering only noun phrases, for example, there are as many as N factorial (N!) "readings" corresponding to the number of permutations of generalized quantifiers introduced for each noun phrase. In practice, the number of linguistically plausible logical readings is smaller but nonetheless explosive. Logical reasoning with knowledge "contained" in text requires that the disjunction of readings resulting from such NLP be effectively eliminated or that means of reasoning more directly with underspecified representation be developed.

Noun phrases are not the only source of scope ambiguities, however. Additional ambiguities arise, for example, with regard to the implicit events or situations of Davidsonian representation. Typically. Davidsonian representation of circumstances involves an implicit variable for each verb and prepositional phrase, for example. Furthermore, ellipsis frequently results in arguments of valent lexemes (especially transitive verbs, but also including transitive adjectives and nouns) being omitted from parses returned by NLP. Such elided arguments, although missing from the grammatical analysis of NLP, are typically required in axioms of formal logic using Davidsonian predicates or certain semantic roles of neo-Davidsonian representation. Each of such arguments to predicates in the axioms of formal logic may contribute an additional quantifier, thereby further exploding the logical ambiguity of even fully disambiguated parses (e.g., the final products of treebanking).

Reference Ambiguity

In under-specified semantics resulting from NLP, predicate-argument structures may involve arguments that logically refer to another, such as in the case of pronouns, definite references, and other forms of anaphora. In other cases, a predicate may logically require an argument which does not occur within the text, such as omitting the subject of a passive verb and other forms of ellipsis. Either of ellipsis or anaphora may require co-reference resolution, which may involve logical equality or inequality.

Connective Ambiguities

Depending on the underlying NLP system, the logical semantics of linguistic conjunctions, such as coordinating conjunctions, is frequently not explicit in the parse information returned. That is, even after unambiguous treebanking, the logical semantics of a conjunction may remain logically or semantically ambiguous. Such ambiguity may be structural (i.e., concerning which constituents belong to the conjunction) or semantic. Grammatical disambiguation typically resolves most structural ambiguity while typically leaving semantic ambiguities unresolved. For example, the scope of an 'and' may be clearly specified in a treebank, but whether the semantics is set theoretical union or disjunction (i.e., collective or distributive) typically remains underspecified. Similarly, the scope of an 'or' may be clarified during grammatical disambiguation, but whether its semantics is inclusive or exclusive typically remains underspecified.

Even when the structural ambiguity of connectives is resolved, whether a quantifier is within the scope of a connective versus the connective being within the scope of a quantifier typically remains unresolved after treebanking. The relative scope of quantifiers with regard to connectives is particularly troublesome and important with regard to negation (a degenerate, i.e., unary, logical connective).

Grammatical Complexity

General purpose, broad-coverage NLP systems use a variety of grammatical formalisms and techniques to parse natural language. The simplest context-free grammars (CFG) model language with a small set of non-terminals corresponding to basic parts of speech and types of phrases and clauses. The most basic parts of speech include nouns, verbs, adjectives, adverbs, conjunctions, prepositions, and articles. The most basic types of phrases include noun phrases, verb phrases, and prepositional phrases. And the most basic types of clauses include non-finite clauses, relative clauses, and sentences. The parses resulting from NLP using a CFG correspond to tree structures where the leaves are parts of speech classifying the input lexemes by part of speech, internal nodes correspond to phrases or clauses, and the root node corresponds to the input sentence.

CFG lack any semantic constraints, such as agreement between the person, number, gender, tense, aspect, mood and other semantics of natural language and logic. Consequently, the parses resulting from NLP using CFG include parses that make no sense, semantically or logically speaking. As a result, many NLP systems eschew or extend CFG in order to avoid results that make no sense. Alternatives to CFG include various formalisms, most of which may be classified as being dependency- or constituency-based formalisms.

Constituency-based formalisms typically produce parses in which a sentence comprises constituent phrases or clauses which typically comprise lexemes, phrases, or clauses. Sentence structures as traditionally depicted in elementary school are constituency-based in that each node spans part of the sentence without gaps. Dependency-based formalisms typically produce parses in which parts of the sentence are related to one another but not necessarily in a way that corresponds to a span of the sentence. Constituency-based formalisms tend to be grammars crafted by linguists while dependency grammars are common in statistical NLP systems. Constituency-based formalisms have been the basis for prior approaches to discriminatory treebanking.

CFG is a constituency-based formalism that lacks semantic constraints, as discussed above. A common technique to extend CFG is to "lexicalize" the grammar such that lexical entries for words are described with more semantics and the production rules of CFG are augmented with constraints between the non-terminals which occur in such rules that are "unified" during parsing. Such lexicalized or unification grammars and processing mechanisms include lexical function grammar, head-driven phrase structure grammar (HPSG), and combinatory categorical grammar (CCG). Parses which result from such grammars include semantic information propagated through unification from lexical entries through the production rules of the grammar to the resulting constituents of such parses. In some such NLP systems, the unification of lexical entries and grammar rules augment parse results with predicate-argument structures corresponding to parts of formulas in formal logic. In one family of HPSG systems, the predicate-argument structures resulting from NLP use a formalism known as "minimal-recursion semantics". In another family of CCG systems, the predicate-argument structures resulting from NLP use a formalism known as "hole semantics". Such predicate-argument structure formalisms are known as under-specified semantic representations. Such representations are under-specified in that they do not resolve the logical quantification of variables or any equalities or inequalities between such variables occurring in their predicate-argument structures (as discussed above with regard to generalized quantifiers, scope, anaphora, and co-reference resolution).

Lexicalized dependency grammars are prevalent in machine learning approaches to NLP. Unlike constituency grammars, which are typically crafted by linguists, machine learning approaches to NLP generally induce a probabilistic context-free grammar or dependency grammar given a vocabulary of lexical entries and, in many cases, a database of "gold parses" as in a treebank. Parses resulting from dependency-based NLP systems lack the non-terminal labels corresponding to production rules of a constituency-based grammar. The results of such NLP formalisms lack the predicate-argument structures discussed above, although various algorithms have been developed to produce constituency and predicate-argument structures from the results of dependency-based NLP.

SUMMARY OF THE INVENTION

The present invention is directed towards incrementally increasing the semantic and logical precision of information extracted from natural language. The invention picks up where traditional approaches to lexical and syntactic disambiguation leave off. It applies state of the art methods to the traditional task of determining the correct grammatical parse from fragments of text (most typically sentences) in an integrated process of semantic and logical disambiguation so as to produce axioms of formal logic which may be as precise as in classical logic formalisms, such as first-order predicate calculus, or less fully specified axioms in which the scope or nature of quantification is under-specified, for example. The resulting axioms allow more precise inference from text along of spectrum of variable precision semantics from more uncertain information extraction thru heuristic reasoning by textual entailment to robust logical reasoning using classical or defeasible logic formalisms.

The present invention is directed to a system for reducing the ambiguity of natural language text so as to increase the precision of its logical semantics for processing by computers and translate sentences from natural language into axioms of formal logic. As such the present invention assists in constraining the logical semantics of text and determines axioms of formal logic which are consistent with sentences of such text given any such constraints.

The present invention clarifies the logical semantics of text by facilitating the acquisition and management of constraints upon certain (e.g., lexical, syntactic, semantic, or logical) aspects of and relationships between constituents of text (e.g., words, phrases, clauses, or sentences) so as to increase the precision of information retrieval, natural language processing, and automated reasoning systems with regard to said text and knowledge expressed therein. The present invention facilitates incremental and collaborative accumulation and curation of such constraints which reduce and may effectively eliminate lexical, syntactic, semantic or logical ambiguities of sentences within said text. The present invention further facilitates acquisition of such constraints using natural language processing (NLP) incorporating feedback of accumulating constraints. The present invention also further facilitates disambiguation by determining and presenting logical axioms that are consistent with accumulating constraints and parses resulting from NLP that are similarly consistent.

The present invention translates sentences of natural language text into sets of axioms of formal logic that are consistent with parses resulting from NLP and acquired constraints as they accumulate. The present invention further presents these axioms so as to facilitate further disambiguation of such sentences and produces axioms of formal logic suitable for processing by automated reasoning technologies, such as first-order or description logic suitable for processing by various reasoning algorithms, such as logic programs, inference engines, theorem provers, and rule-based systems.

In one embodiment, a method for reducing the logical ambiguity of a portion of natural language text is provided. The method includes algorithmically interpreting the portion of natural language text in a computer system into a number of data structures representing one or more interpretations of the portion of natural language text as a number of logical formulas. Each of the data structures include: (i) a number of first data structures representing formulas pertaining to or between referents within any of the interpretations, wherein each of the first data structures represents a predicate using as an argument a variable corresponding to a thing or a situation referenced explicitly or implicitly within the interpretations; (ii) a number of second data structures representing formulas of logical quantification each pertaining to a variable used as an argument in a number of the logical formulas and wherein each logical formula represented by a second data structure has or should have scope over all other logical formulas which use the variable to which the logical formula represented by the second data structure pertains; and (iii) a number of third data structures each representing a constraint on the relative scopes of a respective pair of formulas, wherein each of the third data structures indicates whether one formula of the respective pair of the formulas occurs within the scope of the other formula of the respective pair of the formulas. The method further includes, in a user interface, enabling specifying whether a first particular one of the logical formulas occurs within a scope of a second particular one of the logical formulas so as to augment the constraints represented by the third data structures and reduce the logical ambiguity among the interpretations of the portion of natural language text.

In another embodiment, a method for facilitating interpretation of a portion of natural language text is provided. The method includes: (a) algorithmically interpreting the portion of natural language text by a computer system into a number of partial parses and zero or more full parses, (b) algorithmically deriving a set of discriminants where each discriminant corresponds to a number of the partial parses, (c) algorithmically determining whether or not each of the partial parses is consistent or inconsistent with a subset of the discriminants wherein each discriminant in the subset specifies whether it is consistent with a correct interpretation of the text, (d) algorithmically determining whether each of the discriminants: (i) is consistent with any of the partial parses which are not inconsistent with a correct interpretation of the portion of natural language text; or (ii) is inconsistent with any of the partial parses which are consistent with a correct interpretation of the text; and (e) enabling a user interface for specifying whether or not each of a number of the discriminants is consistent with a correct interpretation of the text.

In still another embodiment, a method for facilitating interpretation of a portion of natural language text. The method includes: (a) algorithmically interpreting the portion of natural language text by a computer system into a number parses, (b) algorithmically deriving a set of discriminants from the parses, (c) algorithmically determining whether or not each of the parses is consistent or inconsistent with the subset of the discriminants wherein each discriminant in the subset specifies whether it is consistent with a correct interpretation of said text, (d) algorithmically determining whether each of the discriminants: is consistent with any of the parses which are not inconsistent with a correct interpretation of said portion of natural language text; or is inconsistent with any of the parses which are consistent with a correct interpretation of said text, (e) enabling a user interface for specifying whether or not each of a number of the discriminants is consistent with a correct interpretation of said text, and (f) enabling in the user interface repeated algorithmic interpretation of said portion of natural language text constrained by any discriminants specified as consistent or inconsistent in furtherance of obtaining correct interpretations.

In yet another embodiment, a method for reducing a number of predicates in an original formula and generating a resulting formula is provided that includes generating one formula in the resulting formula by conflating two formulas in the original formula where a predicate in the resulting formula is composed from a predicate of one of the two formulas in the original formula which modifies a predicate of the other of the two original formulas in the original formula, and displaying the resulting formula on a user interface.

BRIEF DESCRIPTION OF THE DRAWINGS

FIG. 6 is a computer screen shot of a preferred embodiment for discriminatory disambiguation in accordance with the system of the present invention.

FIG. 7 is a computer screen shot of a preferred embodiment of the disambiguation user interface pertaining to logical disambiguation of a selected full parse or an unambiguous sentence of the system of the present invention.

FIG. 8 is a computer screen shot of a preferred embodiment showing results of logical disambiguation after specification of quantifiers and an equality and selection of a reading in accordance with the system of the present invention.

FIG. 9 is a computer screen shot of a user interface for logical disambiguation of readings consistent with a grammatically unambiguous parse in a preferred embodiment of the system of the present invention.

FIG. 10 is a computer screen shot of a user interface for logical disambiguation of readings consistent with a grammatically unambiguous parse after simplification by suppression of "optional" variables in a preferred embodiment of the system of the present invention.

FIG. 14 is a computer screen shot of a preferred embodiment for grammatical disambiguation focused on semantics in accordance with the present invention.

DETAILED DESCRIPTION OF EXEMPLARY EMBODIMENTS

Figure 1:
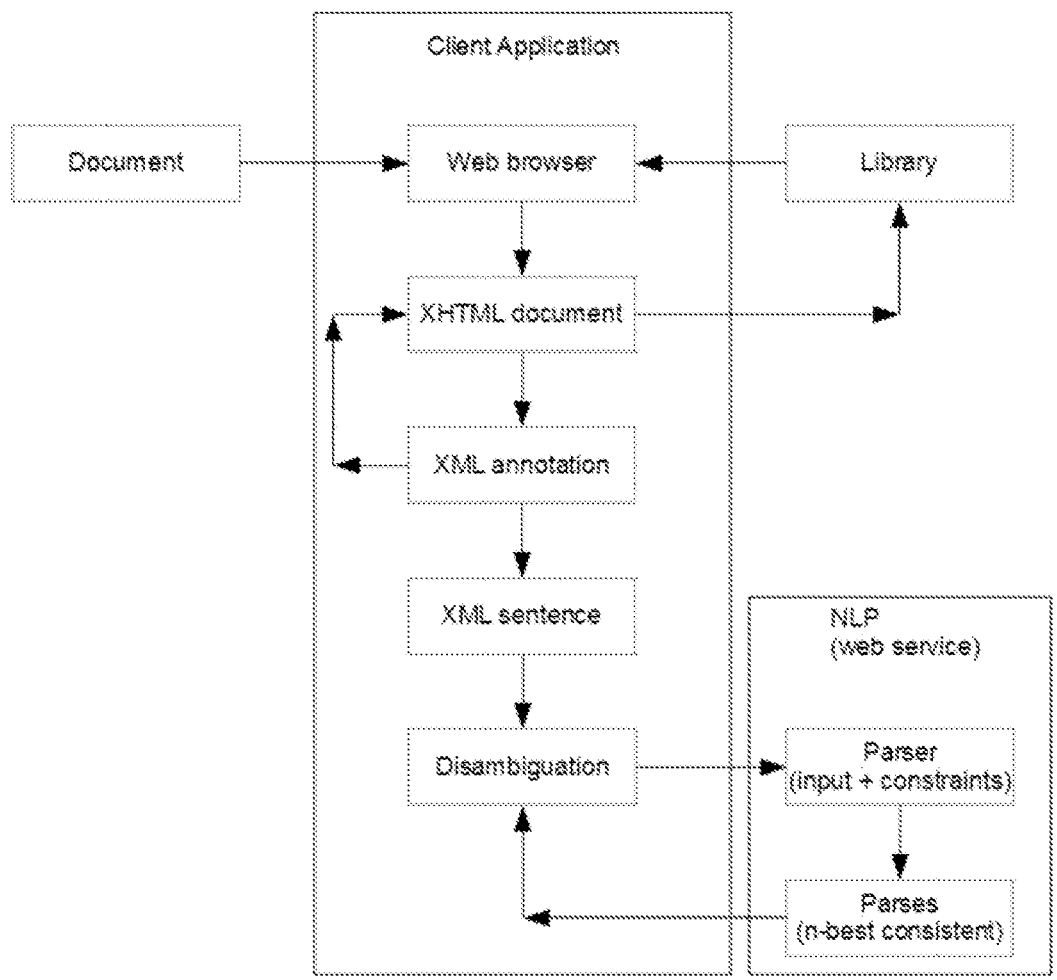
FIG. 1 is a diagram of a preferred embodiment of a knowledge acquisition process in the present invention.

As used herein, the singular form of "a", "an", and "the" include plural references unless the context clearly dictates otherwise.

As used herein, the statement that two or more parts or elements are "coupled" shall mean that the parts are joined or operate together either directly or indirectly, i.e., through one or more intermediate parts or elements, so long as a link occurs.

As used herein, "directly coupled" means that two elements are directly in contact with each other.

As used herein, "fixedly coupled" or "fixed" means that two elements are coupled so as to move as one while maintaining a constant orientation relative to each other.

As used herein, the word "unitary" means a part is created as a single piece or unit. That is, a part that includes pieces that are created separately and then coupled together as a unit is not a "unitary" part or body.

As employed herein, the statement that two or more parts or elements "engage" one another shall mean that the parts exert a force against one another either directly or through one or more intermediate parts or elements.

As employed herein, the term "number" shall mean one or an integer greater than one (i.e., a plurality).

As used herein, the terms "component" and "system" are intended to refer to a computer related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers. While certain ways of displaying information to users are shown and described with respect to certain Figures or graphs as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As shown in FIG. 1, a preferred embodiment of the present invention incorporates a web browser through which web search can be used to find content to be annotated with linguistic, semantic, and logical information. The integrated web browser allows for existing web content to be copied into a library of web pages, as in a wiki, which constitutes the web site to be annotated. Any such web content may be processed through an HTML to XML converter and edited in an integrated XHTML tool. The XHTML tool renders the document object model (DOM) of the XML conformant HTML as a navigable tree structure and renders the content in text and HTML views. Positioning the cursor in the text or HTML expands the DOM tree to expose the XML element containing the cursor and any selected text. An edit operation creates a new XML element within the DOM using a tag selected from an ontology of concepts. The type, attributes, or content of existing XML elements in the DOM may be also edited. In particular, sentences may be selected within web pages and marked as such using XML elements. Furthermore, individual tokens (e.g., words) and sequences of tokens (e.g., phrases or clauses) may be similarly tagged using this facility.

Any XML element corresponding to a sentence may be annotated and disambiguated as described below using this mechanism. The result of annotation and disambiguation is represented as XML which further annotates the tokens, words, phrases, clauses, and sentence as would be annotated using standard annotation tools used in non-discriminatory treebanking.

The set of such sentences annotated within the XHTML content of the web site are presently stored as independent XML documents on a knowledge base server. The client application that incorporates the web browser includes panes displaying all such sentences in addition to the panes for the web browser and the XHTML annotation tool. Sentences not residing within web pages may also be added to the knowledge base by clients.

Figure 2:
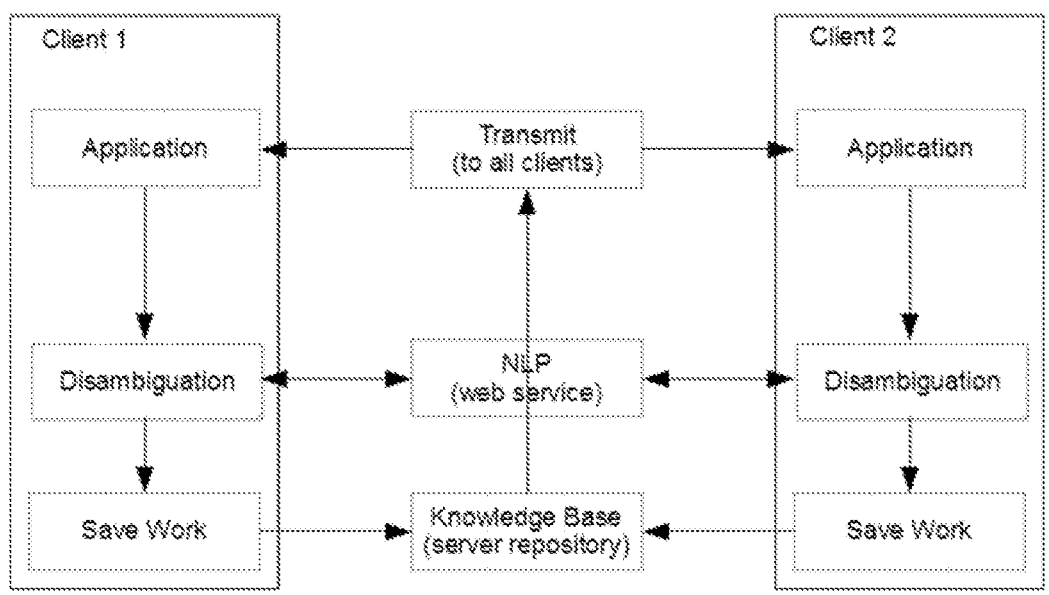
FIG. 2 is a diagram of a preferred embodiment of a collaborative architecture in the present invention.

As shown in FIG. 2, any sentences annotated or added to the knowledge base by one client are made visible to other active clients in the sentences pane. The clients and server collaborate in maintaining provenance information. Clients authenticate with the server and the server records who first adds a sentence to the knowledge base and each change by any other annotator. The time, type and operands of each operation performed is also recorded along with the user of the client. This information is propagated to active clients such that the sentences pane provides real time visibility to the collective activity of annotators.

Figure 3:
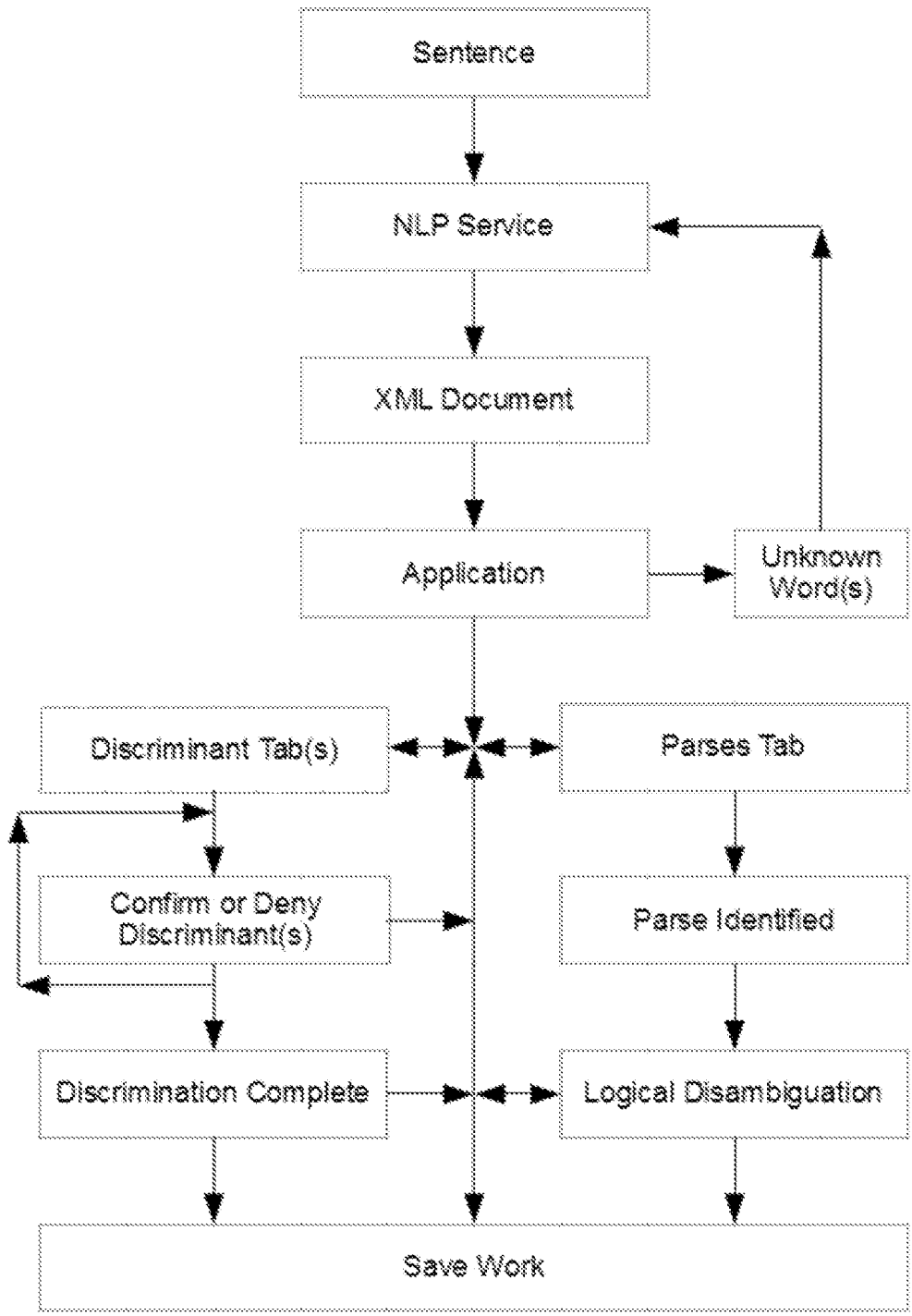
FIG. 3 is a diagram of a preferred embodiment of a disambiguation process in the present invention.

As shown in FIG. 3, when a client commences annotation of a sentence for the first time, an underlying NLP system is invoked so as to provide a number of parses which inform annotation and facilitate disambiguation using the discrimination approach described further below. Although NLP is not strictly required in order to annotate a sentence, the typical and supported workflow is to do so. The results of NLP are presented in one or more tabs within the client application. The tabs provide various perspectives and interactive functionality to facilitate discrimination-based annotation. Upon exiting the client or closing an analysis tab any disambiguation is stored on the server as constraints within an XML document. Partial work with little or no disambiguation activity may be saved, as in loading a knowledge base with a number of initial sentences without manual intervention or in the coordination of work between collaborators who are more focused on grammatical disambiguation versus collaborators who are more skilled at logical disambiguation. In the latter case, the results of partial grammatical disambiguation or completion of grammatical disambiguation to the point of identifying an individual parse may be saved whereupon it becomes visible to others with a status of being unambiguous but non-axiomatic, as discussed below.

The XML document for any given sentence in the knowledge base reflects the status of disambiguation of that sentence. Ideally, a sentence will be axiomatic, in that it will have been disambiguated to the point that a small number of axioms of formal logic have been identified (typically one). Sentences may remain grammatically ambiguous. Grammatically unambiguous sentences are typically either axiomatic or they are logically ambiguous or contain unresolved anaphora, such as pronouns, or ellipsis. A sentence that is grammatically unambiguous but not axiomatic is the end result of prior approaches to treebanking (i.e., logical and semantic ambiguities remain after grammatical disambiguation).

The status of sentences in the knowledge base (including sentences within pages of the web site) are plainly visible to clients and updated in real-time as collaborative curation of the web site and knowledge base proceeds. Various views of extensive information concerning sentences, including their status, provenance, annotation history, recency of various activities, relationships to other sentences, ratings, comments, and axioms are provided with extensive sorting and filtering capabilities. Thus, the architecture and user interface of the present invention facilitate the collective workflow and collaboration among clients.

The system incorporates logic generation capabilities which translate axiomatic sentences into axioms of formal logic in the syntax required by any of various reasoning systems. In particular, the system generates axioms in classical logical syntax as supported by, for example, first-order logic systems (The initial reasoning system targeted is Vulcan's SILK system (The SILK System: Scalable and Expressive Semantic Rules, 2009)). Further, the system analyzes the disambiguated sentences of a knowledge base so as to generate logical axioms that support logical reasoning given the terminology used in the axioms generated directly from axiomatic sentences. These additional axioms comprise an ontology relating the terms (including predicates) used in the axioms generated from axiomatic sentences.

Combined with a lexical ontology incorporated within the present invention, the generated ontological axioms support reasoning using the axioms generated from axiomatic sentences so as to solve problems such as in answering questions.

Overview of Disambiguation Process

Figure 4:
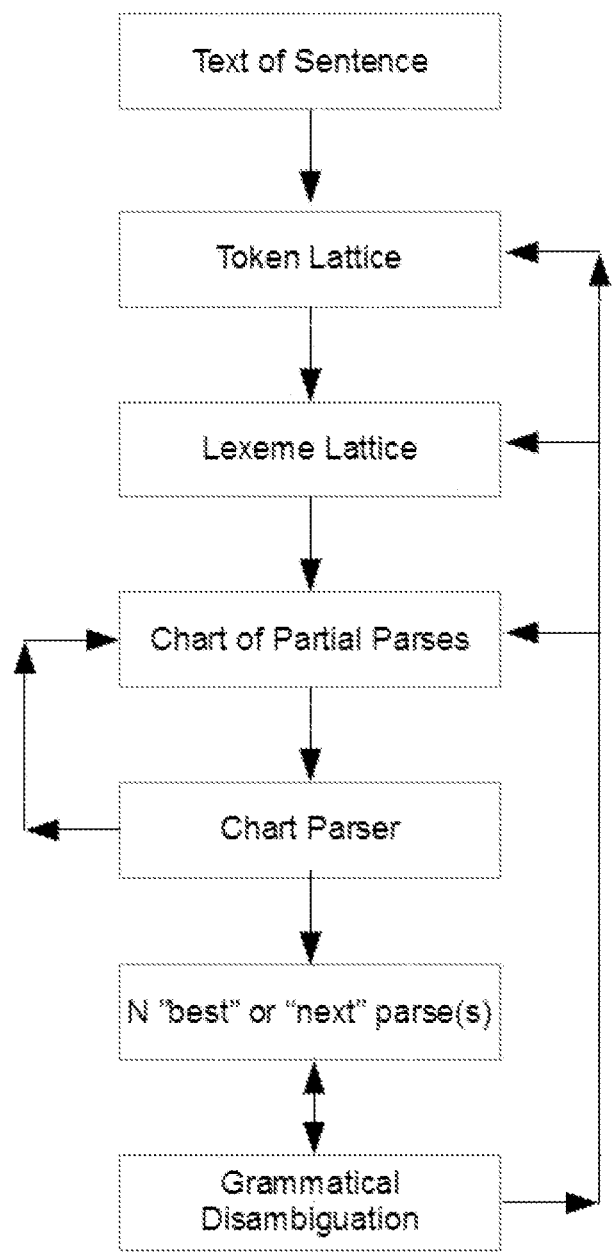
FIG. 4 is a diagram of the preferred embodiment of discriminatory treebanking in the present invention.
Figure 13:
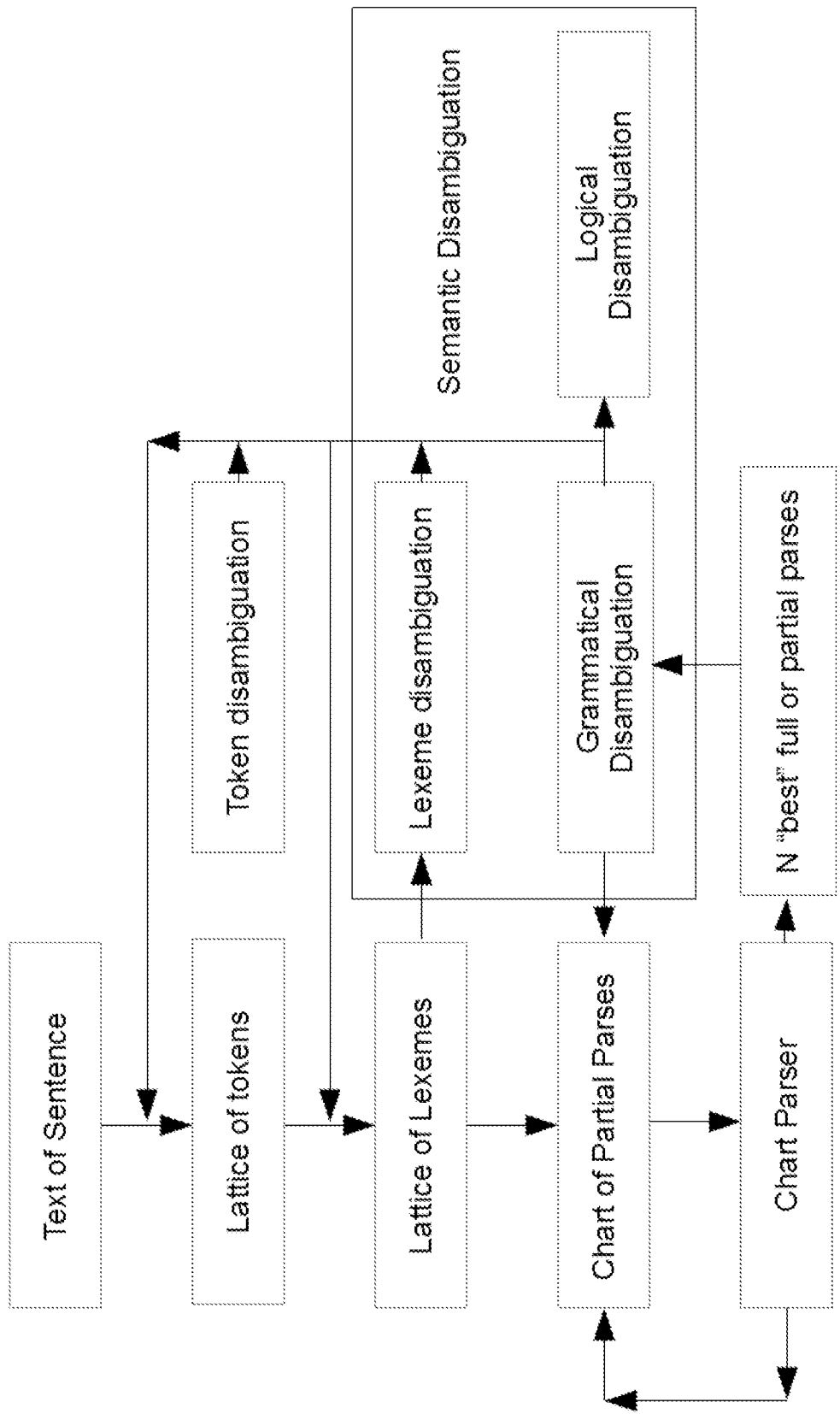
FIG. 13 is a diagram of a preferred embodiment of the integration of the disambiguation and natural language processing subsystems of the present invention.

As shown in FIGS. 4 and 13, the raw text of a sentence to be disambiguated is processed into a partially ordered lattice of tokens which are further processed into a partially ordered lattice of lexemes as input to a chart parser. The tokens lattices is not limited to a totally order sequence as is typical in NLP systems and prior approaches to treebanking, however. This avoids failures arising from tokenization mistakes. One or more tokens along a path through the token lattice are further recognized as lexemes or multi-word expressions, such as words, numbers, dates, times, and other varieties of lexical types commonly occurring in text. For lexemes that are words, parts of speech and lexical features, such as person, number, gender, tense, aspect, mood, and other features which vary with the underlying NLP systems further annotate such lexemes and all lexemes are used as the initial state for parsing using any of various NLP systems. In the case of chart parsers, as are common in statistical, dependency, and grammar-based NLP systems, the lattice of lexemes populates the chart initially whereupon the parsing algorithms repetitively analyze and augment the state of the chart, typically until finding one or more parses which span the input, failing to find any parse which spans the input, or exceeding time or space limitations. The state of the chart when the parses pauses is then available for use in disambiguation.

The preceding describes a preferred embodiment of the present invention in which the underlying NLP system supports a lattice of tokens as input. In some such systems, the token lattice may be the initial input to the chart and the parsing algorithm may derive the lexeme lattice using algorithms or data structures, such as lexical entries when natural language processing is based on a lexicalized grammar, such as head-driven phrase structure grammar (HPSG) or combinatory categorical grammar (CCG), for example. In less preferred embodiments a token disambiguation step may be introduced between morphological analysis and subsequent lexical and syntactic processing or as remediation if disambiguation fails to determine an acceptable parse given incorrect tokenization assumptions.

Similarly, the preceding describes a preferred embodiment of the present invention in which the underlying NLP system is not limited to a totally ordered sequence of lexemes each tagged with a single part of speech. In such less preferred embodiments, a part of speech disambiguation step may be introduced after or in combination with token disambiguation before subsequent syntactic processing or as remediation if disambiguation fails to determine an acceptable parse given incorrect part of speech tagging assumptions.

In a preferred embodiment, the underlying NLP system should be capable of performing lattice tokenization and part of speech tagging given the raw text so as to consider all possible tokens and lexemes which might possibly yield one or more partial parses. In a further preferred embodiment, the present invention has access to token and lexeme lattices as well as the partial and full parses residing in the chart when NLP pauses. In the event that an underlying system is limited in either regard, the present invention may augment its tokenization and part of speech tagging capabilities with auxiliary information and processing, such as regular expression pattern matching for lattice tokenization recognition of abbreviated, misspelled, hyphenated and other morphological variations in lexemes. Moreover, in the present invention, such auxiliary morphological processing may normalize characters, including punctuation and whitespace, such as various UNICODE alternatives for equivalent strings or characters not otherwise handled or recognized as possibly equivalent by an NLP system.

Figure 5:
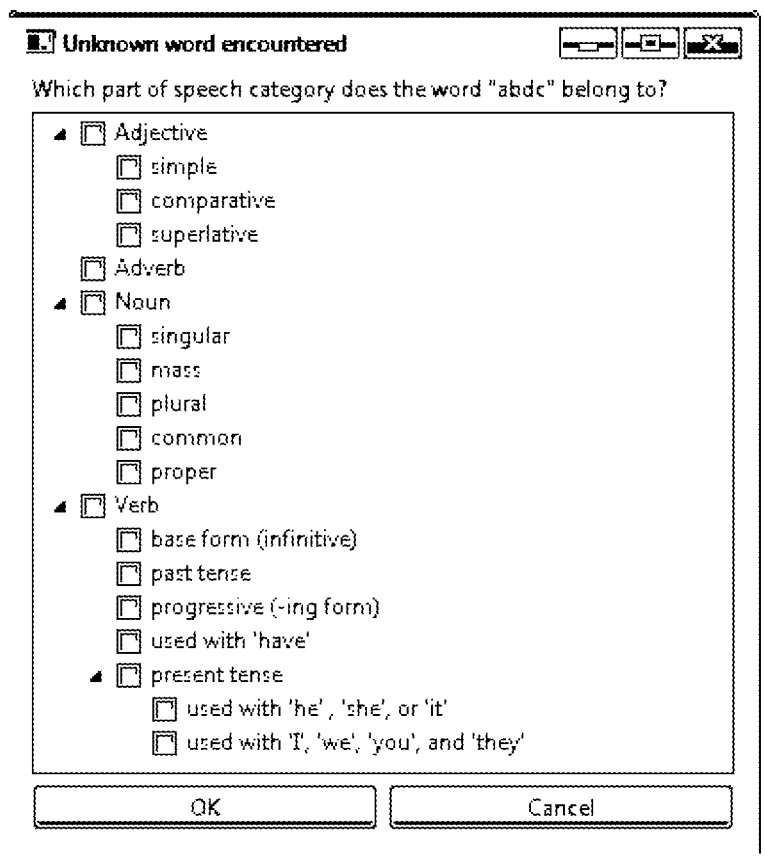
FIG. 5 is a computer screen shot of a preferred embodiment of a user interface for specifying parts of speech for unrecognized tokens, such as words, in accordance with the system of the present invention.

In the preferred embodiment, the foregoing process quiesces with the chart populated with a lattice of tokens, lexemes, and partial and full parses. In some cases there may be a gap where no lexeme covers an interval of the input, such as in the case of an unrecognized or unknown word. In such cases, there will be no full parses. As depicted in FIG. 4, the present invention handles lexical gaps and the absence of a full parse. In the case of lexical gaps, the present invention may prompt for clarification as to the plausible parts of speech for tokens adjoining or spanning such gaps, such as shown in FIG. 5. In a preferred embodiment, the system augments the state of the chart with lexemes corresponding to possibly multiple plausible parts of speech. In the event the underlying NLP system is limited to a single part of speech for any such token or span, the system would preclude multiple selection in the dialog shown in FIG. 5.

In a preferred embodiment, the system updates the lexeme lattice as it resides in the chart directly and resumes syntactic processing until quiescence. Alternatively, the system repeats the NLP pipeline, albeit with the constraints acquired thus far during discrimination and from user clarification as to lexical gaps. In the present invention, such more informed and constrained NLP is realized by providing the NLP with a token and lexeme lattice that are limited to the tokens and lexemes that are consistent with user input recorded for all prior disambiguation (including the current and prior sessions, unless such disambiguation inputs have been "reset" or cleared, as discussed below). In addition to constraining NLP morphologically and lexically, the system can constrain syntactic and semantic processing, as discussed below.

NLP may quiesce with no full parse spanning the input for several reasons other than lexical gaps. In one such cases, the input may not be recognizable given the grammar (or statistical algorithms) of the underlying NLP system. In another common case, the ambiguity of the input may require more time or space than NIP is permitted. Such cases are more common in the case of large vocabulary, broad coverage grammars applied to long sentences, such as are typical when acquiring knowledge from textbooks, for example.

As depicted in FIG. 13, the present invention improves productivity and avoids many failures due to ambiguity by performing NLP iteratively with disambiguation. In a preferred embodiment, for example, the present invention extracts the token, lexeme, and partial parse lattice from the chart and performs disambiguation without full parses as required by prior approaches. As the token, lexeme, and partial parse lattices becomes more constrained through disambiguation, NLP may be resumed and proceed with increasing focus. In a preferred embodiment, for example, the present invention sets low limits on the time, space, and number of parses to be computed by NLP. In the event that no full parses are obtained within the allotted resources, discrimination can proceed and NLP be resumed with greater focus, with or without increasing allotted time or space. In the event that the specified number of parses are obtained, discrimination can proceed as normal and be followed by repeatedly resumed NLP until disambiguation is completed. Most typically, such disambiguation is concluded only after NLP produces less the limited number of parses specified within allocated resources with no ambiguity remaining.

In a preferred embodiment, the present invention directly updates the chart of the underlying NLP system by removing any tokens, lexemes, or partial parses that are inconsistent with the state of disambiguation. If a token is selected during disambiguation, all overlapping tokens are removed from the chart. If a token is vetoed during disambiguation, it is removed from the chart. When a token is removed from the chart any lexemes that depend on it are similarly removed from the chart. When a lexeme is selected during disambiguation, its constituent tokens are also selected, any conflicting tokens are removed as discussed previously, and any overlapping lexemes are removed from the chart. When a lexeme is removed from the chart, any partial or full parses that use it are similarly removed from the chart. When a partial or full parse is selected during disambiguation, the lexemes or partial parses on which it depends are selected, thereby eliminating conflicting alternatives from the chart as discussed here, and any overlapping but uncontained parse is removed from the chart. All this computation is in order to focus NLP and is in addition to the standard computations of discriminatory treebanking.

In other preferred embodiments, where direct access to the chart of the underlying NLP system is not practical, the present invention may be limited to focusing NLP morphologically and lexically as discussed above. In one such preferred embodiment, the specific lexical entry corresponding to a particular syntactic valence and coarse semantics of a word may be specified so as to constrain partial parses accordingly. In another such preferred embodiment, the intervals implied by discrimination may be used to filter the parses that are efficiently enumerated best-first by various dynamic programming algorithms commonly used in underlying NLP systems. In this embodiment, a result enumerated from NLP will be filtered if it overlaps without subsuming the interval of any token, lexeme, or parse implied by discrimination thus far.

In the present invention, the state of the chart residing in the underlying NLP system may be reflected in real-time on a user interface through which discriminatory disambiguation may proceed concurrently with NLP. In a preferred embodiment, disambiguation and NLP are physically disconnected but logically interleaved. In said embodiment, the present invention communicates the results of NLP for disambiguation which communicates constraints for further NLP. The information conveyed from NLP to disambiguation consists of the constituency structure of full parses or the contents of the chart of input and intermediate results. The information conveyed from disambiguation to NLP includes any revision of the input sentence, possibly including a lattice of tokens or lexemes, or updates concerning the selection or refutation of chart items arising during disambiguation. In the present invention, such communication is in the form an XML document communicated over the Internet between a web service and a client application which includes the user interface by which disambiguation is performed.

At any point the XML documents communicated between the NLP service and the disambiguation user interface may be stored on a server also accessed over the Internet by the client application. Such a server acts as the repository for all sentences subjected to or to be subjected to such NLP, disambiguation, and knowledge acquisition activity. Such a repository of sentences may be called a "knowledge base". In the case of the present invention, documents may also persist in a server repository, such as web pages from which sentences residing in such a knowledge base originated or are otherwise related so as to be linked to or render information obtained through disambiguation, such as lexical, syntactic, semantic, and logical annotations of such sentences arising from such disambiguation. Such a repository of documents may be called a "library". The whole of the document and sentence repositories may also be called a knowledge base and rendered as web pages, such as on a wiki with linguistic, semantic, and logical annotations and supporting a client application for annotation via disambiguation as described here.

Each time a client adds a sentence to the repository and accesses a sentence in the repository the authenticated user and the activity and operations performed using the disambiguation user interface are recorded within the sentence's XML document as it persists in the repository on the server. If the sentence originates from a document, such as a web page accessed using a browser integrated within the client application, the source of said sentence is also recorded in its persistent XML document. Consequentially, the XML document for a sentence includes provenance and version control information along with an event log.

The initial state of a sentence's XML document in the repository may be as simple as the text of the sentence but typically includes its initial source and author along with when it was created. The state of a sentence which has undergone NLP includes additional information such as its length, number of parses, and status with regard to ambiguity. The document may include information corresponding to the quiescent state of NLP or omit such information if no disambiguation has yet occurred. The document includes complete information concerning disambiguation information added by users, including which elements results from NLP have been affirmed or refuted during disambiguation. An event log includes who performed each such affirmation or refutation when, including whether prior disambiguation activity was cleared or undone and whether NLP was repeated with or without editing the text of the sentence. In the event that the text of the sentence is modified, an event logs who and when the edit was performed along with prior version information of the sentence before such an edit.

The current state of disambiguation for any sentence within the knowledge base resides within its XML document. Such state ranges from unparsed to grammatically disambiguated and further to logically disambiguated. Parsing an unparsed sentence results in an "incoherent" sentence if no full parses were determined by NLP. The status of a sentence may also be incoherent if no full parse resulting from NLP has survived prior disambiguation. The status of a sentence is "ambiguous" if more than one full parse has resulted from NLP and survives any prior disambiguation. If only a single full parse results from NLP or survives prior disambiguation, the status of the sentence is "unambiguous". The status of an unambiguous sentence becomes "axiomatic" if ambiguities of quantification and reference have been resolved.

Figure 6:
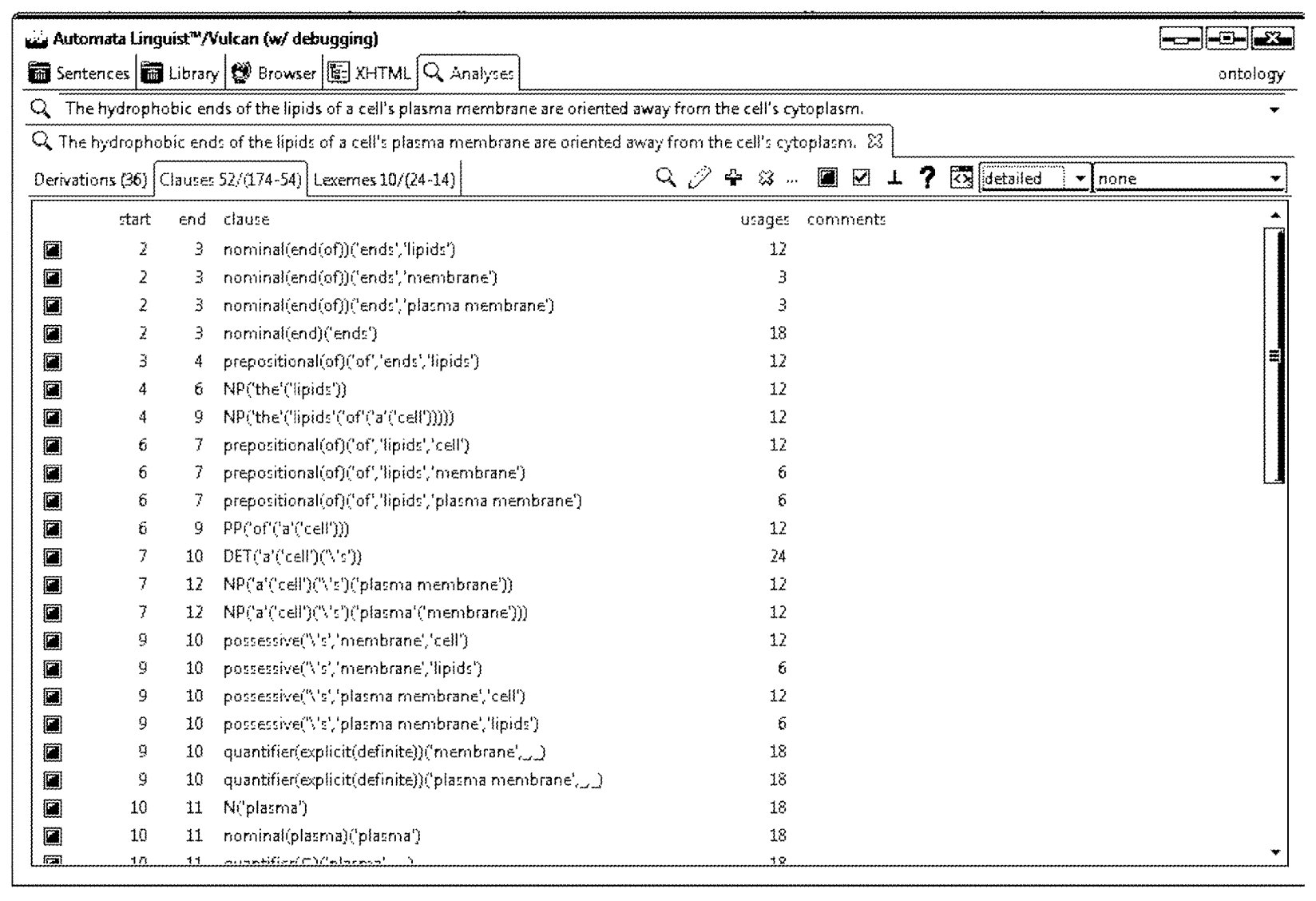
Figure 7:
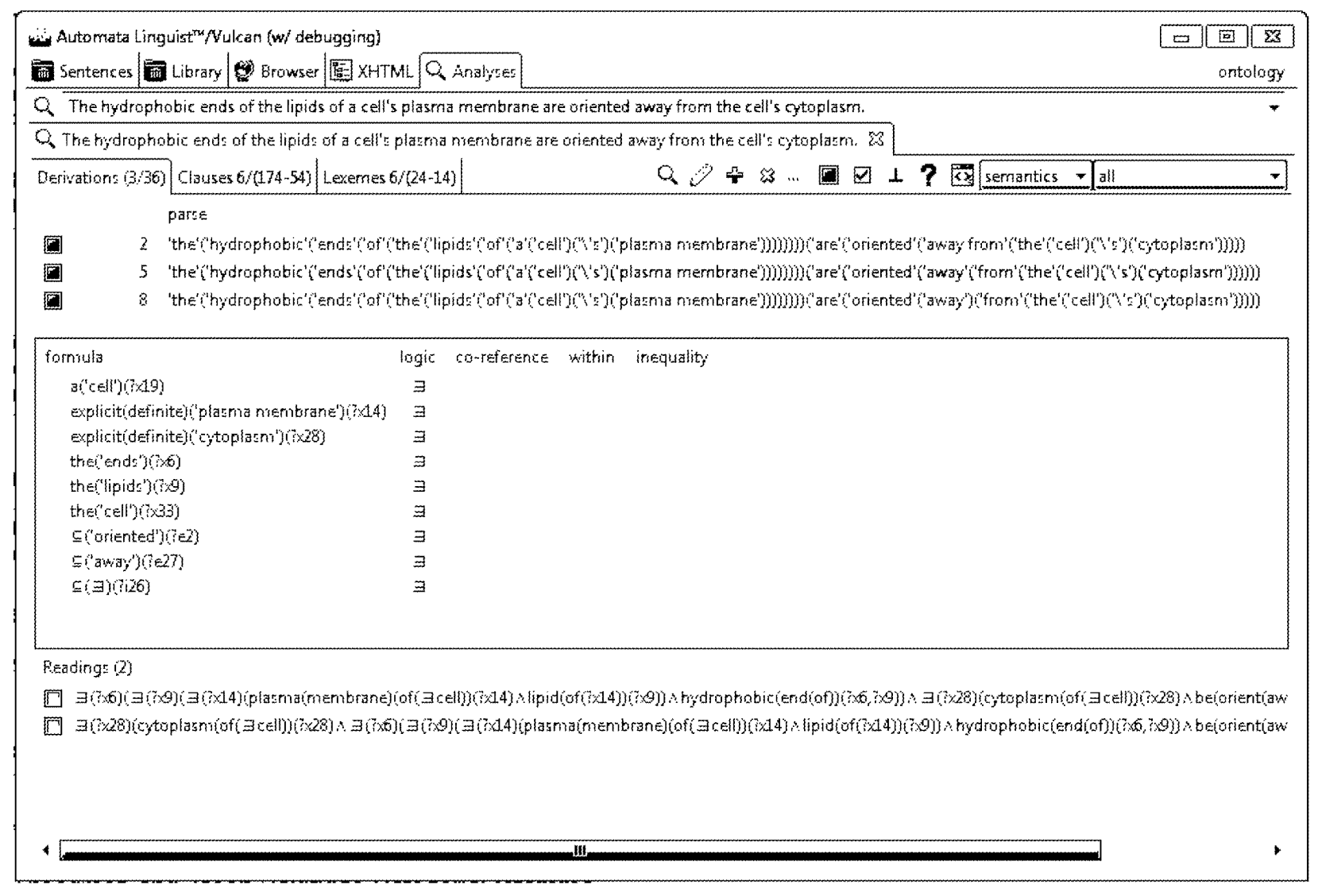

Upon receipt of an XML document from the knowledge base or NLP for presentation in its disambiguation user interface, the client application renders any or all of lexical gaps (as discussed above), discriminants, or logical information. If the sentence is ambiguous the client application focuses on a presentation of discriminants as shown in FIG. 6. In its default configuration, the user interface presents logical information if the sentence is unambiguous (including axiomatic) or when the user focuses on an individual full parse, as shown in FIG. 7 in which the middle one of three parses shown is selected.

In FIG. 6, the "clauses" tab combines lexical, syntactic and semantic discriminants in accordance with the user's selection of "detailed" in the combo-box on the toolbar to the upper right. FIG. 6 includes a "derivations" tab showing parses returned by NLP or that have survived disambiguation thus far as shown in FIG. 7. FIG. 6 also includes a "lexemes" tab indicating that there is lexical ambiguity remaining. The icons on the toolbar are in their default configuration. The default configuration does not show any discriminant that occurs in all surviving full parses (i.e., which does further discriminatory disambiguation). Unlike prior approaches which assume exhaustive parsing prior to discrimination, the client application allows discriminants which do not participate in any full parse to be presented (such as to further iterate with parsing). By default, the client application does not show discriminants which have been affirmed or refuted until the sentence is unambiguous, at which point the client application focuses on the derivations tab on which logical information is presented as in FIG. 9.

Figure 14:
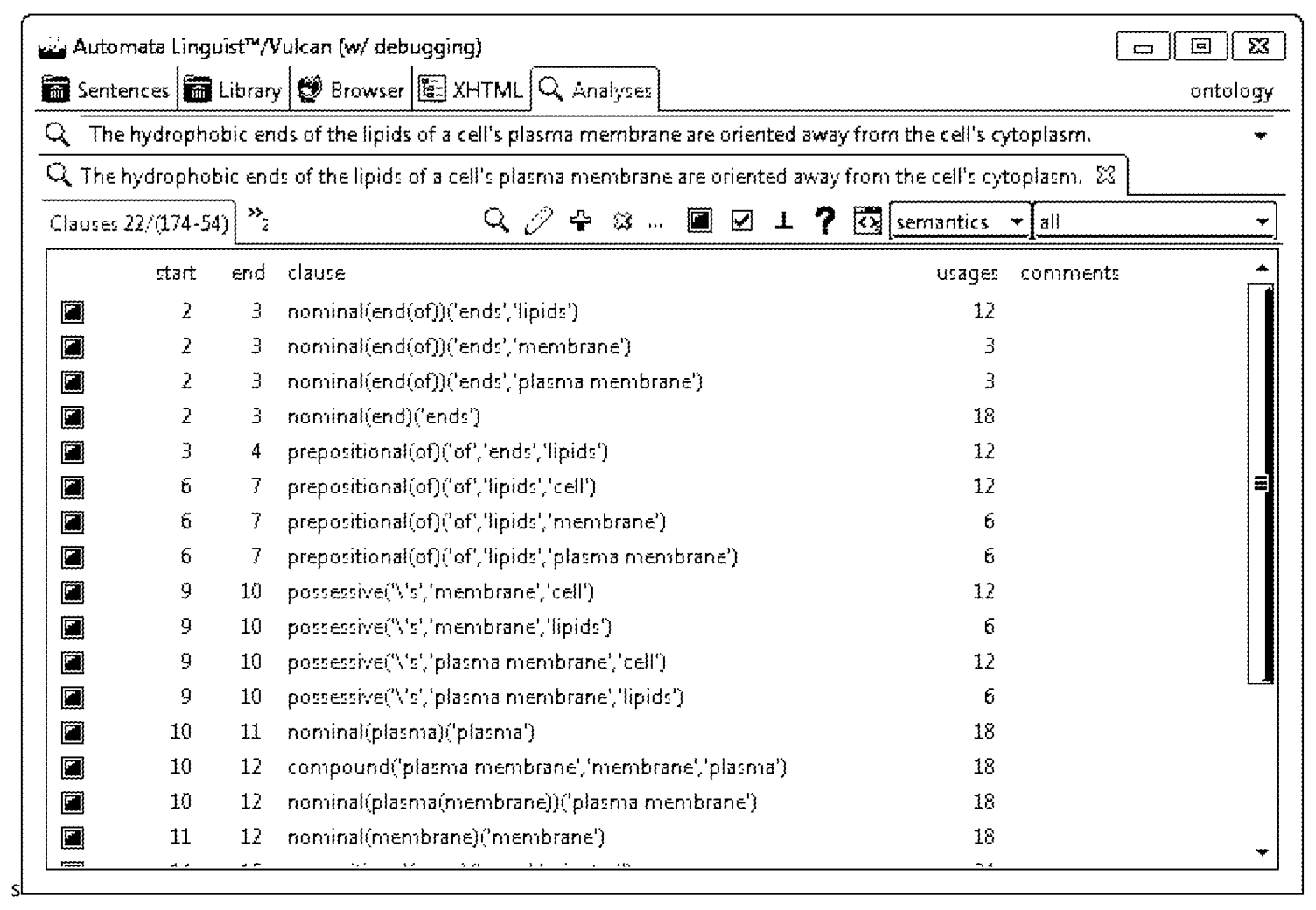

When the client application receives an XML document from the knowledge base or NLP for an ambiguous sentence it extracts the tokens, lexemes, and partial parses with default focus on those that participate in full parses that survive discrimination thus far. If the document contains no full parses, the contents of the chart that are consistent with any discrimination thus far are considered, unlike prior approaches to discriminatory disambiguation. For each such constituent of any surviving full parse or the chart, the application presents a clause abstracting the details of the constituent. Such rendered clauses are abstractions in that they omit or generalize details resulting from NLP so that they are accessible to non-linguists. FIG. 6 shows lexical, syntactic, and semantic clauses which result from such processing. FIG. 14 shows a subset of the clauses in FIG. 6 which are more semantic, such as relating concepts designated by various tokens and their lemmas (which appear as terms in the predicates of various discriminants rendered therein).

Constituents resulting from an NLP system typically include the non-terminal of the production rule in its grammar that produced the constituent. The number of distinct non-terminals in broad-coverage grammars typically ranges in the hundreds of morphological and syntactic rules plus tens of thousands for the lexical entries of a large vocabulary NLP system. The variety of labels for such non-terminals is overwhelming, even for linguists. Consequently, the present invention incorporates an ontology of constituent types, roughly corresponding to the basic parts of speech, the non-terminals of a simple CFG with additional categories for various morphological and lexical rules which handle phenomena such as inflection and affixation. In adapting the present invention to an underlying NLP system, algorithms or data structures are defined which classify the labels that may result from NLP into said ontology.

Generally, tokens correspond to intervals of the input text. Tokens may be provided to NLP or computed by an underlying NLP system. Lexemes may also be provided or computed by the NLP system. Lexemes correspond to a sequence of tokens occurring in the possibly augmented input lattice of tokens along with one or more morphological or lexical rules that recognize how a lexeme may be derived from the stem of its lemma. The amount of information available with a lexeme from an NLP system varies widely but may be quite detailed in the case of lexicalized grammars.

The linguistic ontology of the present invention introduced above includes the following attributes or categories concerning lexemes:

1. number: plural, singular
2. person: first, second, third
3. gender: masculine, feminine, non-neuter, neuter
4. mood: indicative, subjunctive
5. tense: past, future, un-tensed, tensed
6. form: declarative, interrogative, imperative, non-imperative
7. individuated
8. perfected
9. progressive In a preferred embodiment of the system of the present invention, any such information concerning a lexeme within the chart of an underlying NLP system is taken together with the lemma of said lexeme and the token(s) of said lemma to construct discriminants. Such discriminants are rendered as unary or binary predicates in which the first argument is the lemma or concatenated tokens. The present invention renders some predicates as unary and others as binary based on user experience. For example, "number('his',singular)" vs. "singular('his'). In other cases, the representation is a binary predicate in all cases, such as "perfected('running',true)" vs. "perfected('running',false)" where the latter results only if the results of NLP are explicit regarding such predicates.

In a preferred embodiment of the system of the present invention, part of speech categories are composed with the lemma and lexeme occurring in NLP results to produce a discriminant such as "nominal(end)('ends')" or "verbal(end ('ends')" as shown in FIG. 14. Of course, a wide variety of such renderings are possible. It should be noted, however, that there may be multiple lexical entries for homographic words and senses of a word that vary in their valence or semantic constraints as processed, for example, by a unification grammar. In a preferred embodiment, the present invention produces one discriminant for a lexical entry of a given part of speech even if there are multiple lexical entries with similar valence. In the sentence of FIG. 5, for example, there are two valences of the noun 'ends' and one for 'cell'.

Note that information about the position of a lexeme within the input is not presented in the discriminant above. Thus, if a lexeme occurs more than once within a sentence, each will correspond to the same discriminant. For example, in the sentence "a cell has a nucleus", the lexical discriminant for 'a' will be shared by each occurrence. For example, there are 7 occurrences of 3 words which occur more than once in the sentence shown in FIGS. 5 and 6.

Avoiding details concerning lexeme position and lexical entries beyond the coarse categories enumerated above reduces cognitive load during discrimination without sacrificing discriminatory efficacy in practice, principally because the syntactic and semantic relationships which depend on lexical disambiguation are sufficient for such disambiguation. Doing so also reduces the need for linguistic skill and familiarity with details of underlying NLP systems during disambiguation.

Also note that avoiding such details in discriminants leads to compounded reduction in the number of discriminants and the cognitive load during discrimination. For example, in the sentence of FIG. 5, the lexical features for singular and possessive with regard to each occurrence of 'cell' are only needed once. More dramatic reduction of the number of discriminants is possible for syntactic discriminants.

In a preferred embodiment of the system of the present invention, the non-terminals of the syntactic production rules of an underlying NLP system are abstracted away to basic categories such as nominal, verbal, prepositional, and adjectival or adverbial "bar constructions" or phrases (e.g., N, V, P, A spanning more than one lexeme and NP, VP, PP, AP, some of which appear in FIG. 6). Other non-terminals subsuming various types of clauses other syntactic constructions are typically suppressed to avoid their cognitive load and bias towards linguistic expertise. In practice, omitting certain constituents does not interfere with discrimination because the basics of syntax are retained and augmented by semantics, as discussed further below.

Just as the text of an input sentence may have many full parses, so might a span of the input correspond to multiple syntactic non-terminals of the same type. In FIG. 7, for example, the 3 remaining parses end in different verb phrase structures for the same span of the sentence. As shown in FIGS. 5 and 7, syntactic constructions involving more than one lexeme are rendered according to their tree structure traversed in order with an open parenthesis on upward and forward (rightward) transitions and a closing parenthesis on upward and backward (leftward) transitions when viewing the parse as tree rooted at the top and read left to right. Within the rendering, the tokens of individual lexemes are enclosed within single quotes. Alternatively, such discriminants could be rendered without quotes, substituting a space for opening parentheses and dropping closing parentheses, as in rendering a span of the input. Discriminants rendered with their structure reflected as in the former rendering convey more information but such rendering is not required. When such rendering is used, however, more information is gained from each discriminatory action. As discussed above concerning the integration of disambiguation with chart parsers, selecting a constituent comprising several lexemes precludes all other constituents which do not span or are not spanned by the selected constituent. When discriminants are rendered with their internal structure, selections further eliminate any multi-lexeme or -token constituent within the span which is not consistent with the structure of the selected constituent.

In the case of an underlying NLP systems based on dependency-grammar, the techniques of producing discriminants for tokens and lexemes discussed above apply, as do those for syntactic constituents, including the optional rendering of internal structure, such as using parentheses.

As discussed in the background information on NLP, some lexicalized unification grammars produce predicate-argument structures in the course of parsing. Such predicate argument structures correspond primarily to atomic formulas as in classical logic. Each such atomic formula comprises a predicate with a number of arguments. Certain grammatical rules introduce other information that do not logically correspond to predicates or arguments as much as to non-atomic formulas, such as quantifying, modal, or negative formulations which d which have scope over other formulas. For example, the word "no" may indicate a quantifying formulation when applied in a noun phrase or a negative formulation when applied to a verb phrase. Where practical, the linguists who author lexical unification grammars augment the predicate-argument structures resulting from their NLP systems with constraints indicating that certain atomic formulas must occur within the scope of some formulation. In general, however, information regarding quantification and scope is lacking.

The number of predicates that may occur in the results of NLP using a lexicalized unification grammar can be on the order of the number of lexical entries in its vocabulary when the predicates are represented in Davidsonian manner. In a dependency-based parser, such as are common in NLP based on machine learning, the relationships in the results of dependency-based parsing use a finite set of predicates the cardinality of which is typically in the dozens. There is a rough correspondence between the predicates used in dependency-based grammars and a neo-Davidsonian representation of the predicate-argument structures produced by lexical unification grammars. Although the results of dependency-based parsing do not include non-atomic formulations, per se, the limited information regarding non-atomic formulations and their scope provided by lexical unification grammars can be obtained by computation given the dependency relationships of a parse and the parts of speech by which the arguments in those relationships are typically tagged.

In the present invention, predicates of atomic formulas produced by underlying NLP systems in Davidsonian or neo-Davidsonian are classified within an ontology of semantic types. If such an atomic formula was introduced by or refers to a head lemma rather than a rule in the grammar, the lemma is associated with the atomic formula. If the representation produced by NLP lacks the Davidsonian variable representing the state in which the atomic formula holds, such a variable may be introduced. In the case of any non-atomic formulas resulting from NLP, such as for conjunctions, negation, and modal formulations, each is typically also given Davidsonian variables. In some cases, such as for nominal predicates, in particular, Davidsonian variables may be omitted on the assumption that an entity will not change types. If desired, however, the present invention may add Davidsonian variables in all cases.

In the event that an expected argument is omitted, such as in the case of ellipsis, some lexical unification grammars will include variables for such elided arguments. In other cases, such as in the case of dependency grammars, if information such as the lexical entries of the underlying NLP system is available, additional variables may be introduced for such elided variables.

For all variables referenced in the formulas resulting from NLP there must be a quantifier introducing such variable in any logical axioms representing the meaning (logical semantics) of the sentence. Consequently, the present invention ensures that all such quantifying formulations exist for the formulas of a given parse, particularly in the case of an unambiguous sentence prior to logical disambiguation. For example, FIG. 7 shows completely under-specified quantification of the Davidsonian variables "?e2" and "?e27" and for the elided argument "?i26".

The determination of precise logical quantification is beyond the state of the art in natural language for various reasons. For example, in the sentence, "a cell has a nucleus", there are various plausible interpretations for 'a' including universal and existential quantification, as well as singular and plural quantification. The intended semantics is that for all cells, of which there exist more than one, there typically exists only one nucleus in the cell which is not within any other cell. This might be more clearly stated as "Almost every cell has its own nucleus", for example. Note that even "every" cannot be assumed as universal quantification since some cells have no nucleus.

The present invention may leave a quantifier completely under-specified, as in ⊆(?x6)cell(?x6)⊆(?x8)nucleus(?x8) have(?x6,?x8), or apply heuristics to suggest a reasonable default, such as universal for certain lexical entries or existential for others. In doing this, the present invention incorporates an ontology of lexical entries which introduce quantification. For the most part these are articles, including determiners, but other logic, such as modification of nouns by cardinalities or modification of determiners by adverbs or pre-determiners are also considered. The essential point is that no heuristic is reliable. The safest heuristic is to assume a quantifier is existential but even such a cautious heuristic is unreliable, such as in the case of negation.

When presenting the logic for a selected parse or unambiguous sentence as in FIG. 7, a preferred embodiment defaults to existential quantification and provides a user interface by which the quantifier may be changed, such as to universal quantification. For the above example, there would be two readings depending on which of the quantifiers is within the scope of the other, as in ∃(?x8)(nucleus(?x8)∧∃(?x6)(cell(?x6)∧have(?x6,?x8)))
versus
∃(?x6)(cell(?x6)∧∃(?x8)(nucleus(?x8)∧have(?x6,?x8))).

The present invention incorporates an ontology of quantification in which a quantifier is classified in several aspects. Quantification may be singular or plural. For example, there may exist only one of something, such as a mother, or there may exist more than one, such as for ancestors. Complex quantification is commonly terse in natural language, such as the negative universal, "not every" which is typically plural existential.

For example, the subscript '1' in
∀(?x6)cell(?x6)⇒∃$_1$(?x8)(nucleus(?x8)∧have(?x6,?x8))
denotes singular existential quantification. Such rendering is logically equivalent to
∀(?x6)cell(?x6)⇒∃$_1$(?x8)(nucleus(?x8)∧have(?x6,?x8))
but is much simpler to read and more closely aligned with natural language text.

Similarly, the subscript '1' in
∀(?x8)cell(?x8)⇒∀$_1$(?x6)nucleus(of)(?x6, ?x8)⇒ ≿ (small)(?x6,?x8)
denotes singular universal quantification. Such rendering is logically equivalent to
∀(?x6)cell(?x6)⇒
(∃(?x8)(nucleus(of(?x6,?x8))∧⇒¬(∃(?x9)(nucleus(of) (?x6,?x9))∧¬(?x8≡?x9)))
and
∀(?x6)cell(?x6))⇒∀(?x6)nucleus(of)(?x6, ?x8)⇒ ≿ (small)(?x6,?x8)
where the first of these renderings is preferred in the present invention as more comprehensible.

The quantifier aspect ontology includes: existential, universal, negative, singular, and plural aspects and quantifiers composed from them. These quantifiers are presented in a drop-down selection list in the logic column of FIG. 7 when selected by users.

Additional types of quantification supported include singular quantification over an individual, as in the use of a proper noun or pronoun, for example. Similarly, a noun may refer to a type or set rather than individuals which may introduce a higher than first-order variable or support distributive or collective reference, where the variable introduced denotes a set and a reference to the variable may be to a member or subset, whether proper or the entirety of the set.

In addition to ambiguity with regard to the quantifier, the user interface depicted in FIG. 7 addresses another need for disambiguation of the system of the present invention. The information provided by NLP systems generally lacks information about the relative scope of quantifiers. In some cases, such as using certain lexical unification grammars, an NLP system may indicate some constraints that an atomic formula must be within scope of another formula, but any such information is far from complete or sufficient for logical disambiguation.

An important observation of natural language is that universal quantification expressed in English, for example, ubiquitously involves an antecedent and a consequent. That is, universal quantification expressed in natural language practically requires each of an antecedent and consequential formula. Alternatively, universal quantification in natural language can be viewed as having scope over an implicative formulation. Existential quantification, on the other hand, applies to a single formula which may or may not be atomic.

In the present invention, when implicative quantification is specified during disambiguation, such as in the case of selecting the universal quantifier, it must be the case that an atomic formula referencing the variable it introduces occurs outside of negation as part of the quantifying formulations antecedent (or, in the alternative view, within the antecedent of its implicative formulation). Furthermore, the quantifying formulations that introduce any other variables in the formula that must be part of an antecedent must have scope over such antecedent. Further, if a quantifying formulation is within the scope of another it cannot have scope over both of the broader formula's antecedent and consequent.

For example, when universal quantification is specified for the quantifier concerning the cell in the sentence, "a cell has a nucleus", the present invention defaults to an implicative interpretation rendered as ∀(?x6)cell(?x6)⇒∃(?x8)(nucleus(?x8)∧have(?x6,?x8)). Furthermore, the present invention defaults to an existential implicative interpretation of universal quantification, which may be explicitly rendered as in:

∀∧∃(?x6)cell(?x6)⇒∃(?x8)(nucleus(?x8)∧have(?x6,?x8))

for example, where '∀∧∃' is more comprehensible shorthand than rendering the conjunction of:

∃(?x6)(cell(?x6)∧nucleus(?x8)∧have(?x6,?x8))
and
∀(?x6)cell(?x6)⇒∃(?x8)(nucleus(?x8)∧have(?x6,?x8))

The present invention also augments any constraints received from NLP to include the implications of the constraint that every atomic formula that references a variable must be within the scope of the quantifying formula that introduce said variable.

In addition to the above, linguistic conjunctions, whether implicit or explicit, introduce additional constraints. The present invention classifies the semantic predicates produced by NLP for linguistic conjunctions as either subordinating or coordinating. All formulas within a coordinating formulation must reside within the scope of said formulation. In the case of formulations produced for subordinating conjunctions, the present invention classifies each as forward or reverse implicative, each of which requires both an antecedent and consequential formula. For example, the present invention classifies one of the lexical entries for 'while' as reverse implicative. Consequently, after disambiguation, the sentence "the plasma membrane of a cell expands while it grows" may be rendered in one configuration of the present invention as ∀(?x8)cell(?x8)⇒(∀(?x6)plasma(membrane(of(?x8))(?x6)⇒expand(?x6)⇐grow(?x8))

where the Davidsonian variables for the verbal predicates have be suppressed for convenience.

Variables occurring in both the antecedent and consequential formulas of such implicative formulations must be introduced by quantifying formulations which have scope over all formulas in either (both) its antecedent and consequent. Furthermore, the implicit antecedent formula must reference the variable introduced by its quantification and do so outside of negation so as to provide a binding for any other reference. Moreover, the consequential formula must also be within the scope of the quantification but outside the scope of the antecedent. Existential quantification, on the other hand, has scope over a single formula wherein the variable must be referenced non-negatively so as to provide a binding.

Note that enforcing the insights regarding the typically existential and implicative nature of quantification in natural language also increases disambiguation productivity since such additional (implicit) constraints reduce ambiguity.

All formulas arising within a noun phrase must be within the scope of the quantifying formulation introducing the variable for said phrases head. Such a constraint also holds for other types of phrases and clauses.

The point here is not to enumerate the full logic of the present invention with regard to deriving constraints but to indicate that many constraints accumulate so as to constrain the relative scopes of quantifying formulations arising from NLP. In the common case, however, all such constraints, no matter how completely considered and enforced, do not typically resolve all relative scope ambiguity.

Figure 12:
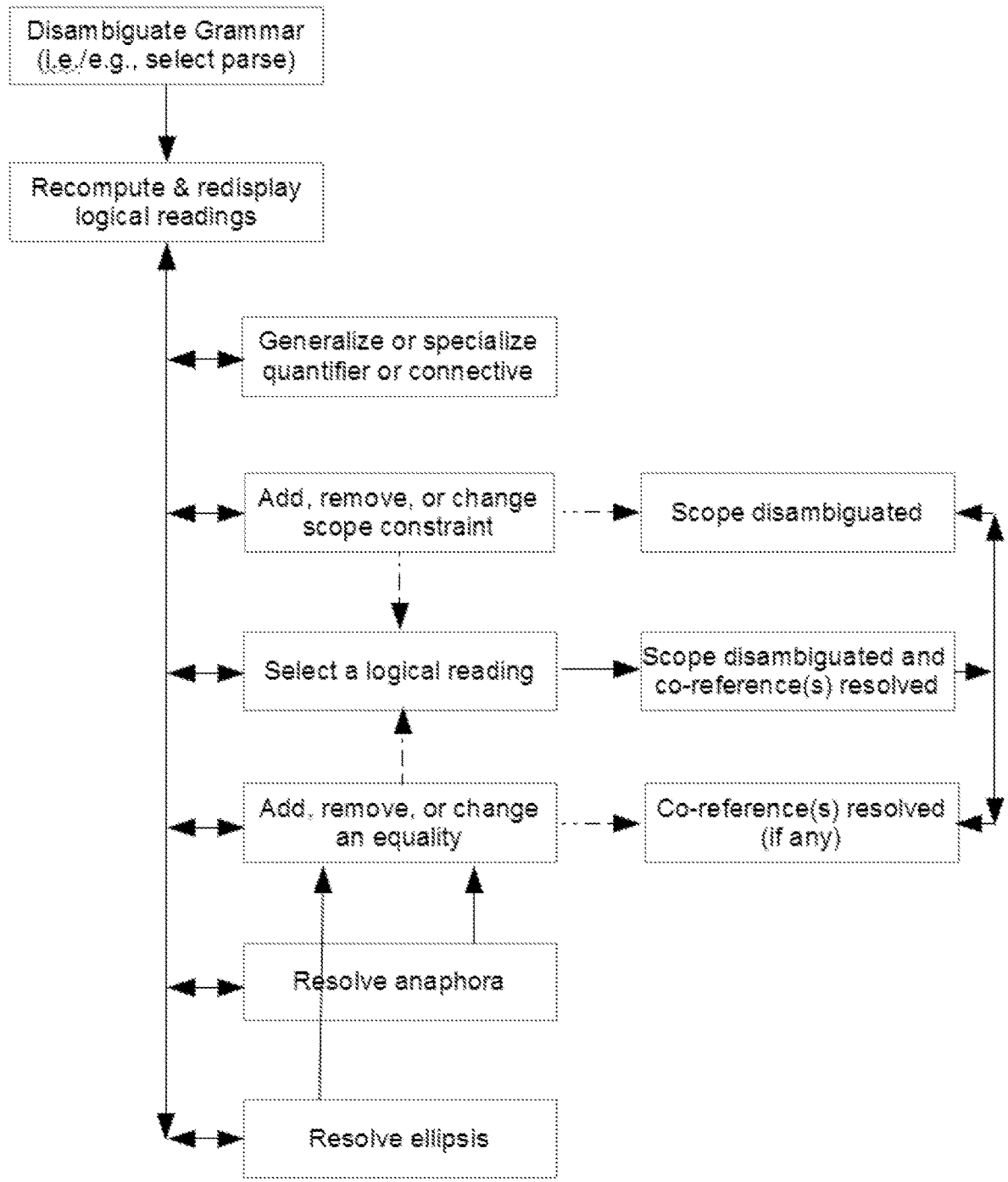
FIG. 12 is a diagram of a process for disambiguating logic in a preferred embodiment in accordance with the system of the present invention.

A preferred embodiment of the system of the present invention provides a user interface, such as depicted in FIG. 7 and as illustrated in FIG. 12, by which a user can add constraints on the relative scopes of non-atomic formulas in particular. In said user interface, a formula, such as a quantifying, negative, modal, or subordinating or coordinating formulation, may be constrained to be within another such formulation by dragging the first said formulation and dropping it on the second. Alternatively, the user may specify using a drop-down selection in the "within" column depicted in FIG. 7 from which another non-atomic formula may be selected. The user interface precludes dropping one formula on another in violation of existing scope constraints or informs the user if doing so via the drop-down list would violate existing constraints. The user interface also allows user-specified constraints to be relaxed by either operation. Moreover, the user interface allows a formula to be specified as having outermost scope contain all other formulas if such a specification does not violate constraints other constraints, especially those not specified by users.

A preferred embodiment of the system of the present invention provides a user interface, such as depicted in FIG. 7 and as illustrated in FIG. 12, by which a user can specify equalities or inequalities between variables, such as in the case of definite reference, occurrences of pronouns, and other forms of anaphora. In said user interface, the variable of one quantification may be specified as being the same as or disjoint from the variable of another variable. Variables specified as being the same are logically equal and do not require more than a single quantification in any resulting reading or axiom. Variables that are disjoint correspond to a negated equality and require distinct quantifying formulations.

In addition to presenting the lattice of scope constraints, such as in the tree of non-atomic formulas shown in FIG. 7, the present invention computes and presents the set of readings that are consistent with such constraints such as in the table of readings at the bottom of FIG. 7. Such computation and presentation occurs after grammatical disambiguation and after each logical disambiguation activity depicted in FIG. 12. As the user adjusts scope constraints the readings are updated in real time. The user may select any of these readings and any additional scope constraints will be immediately reflected in the tree rendering of such constraints.

Figure 8:
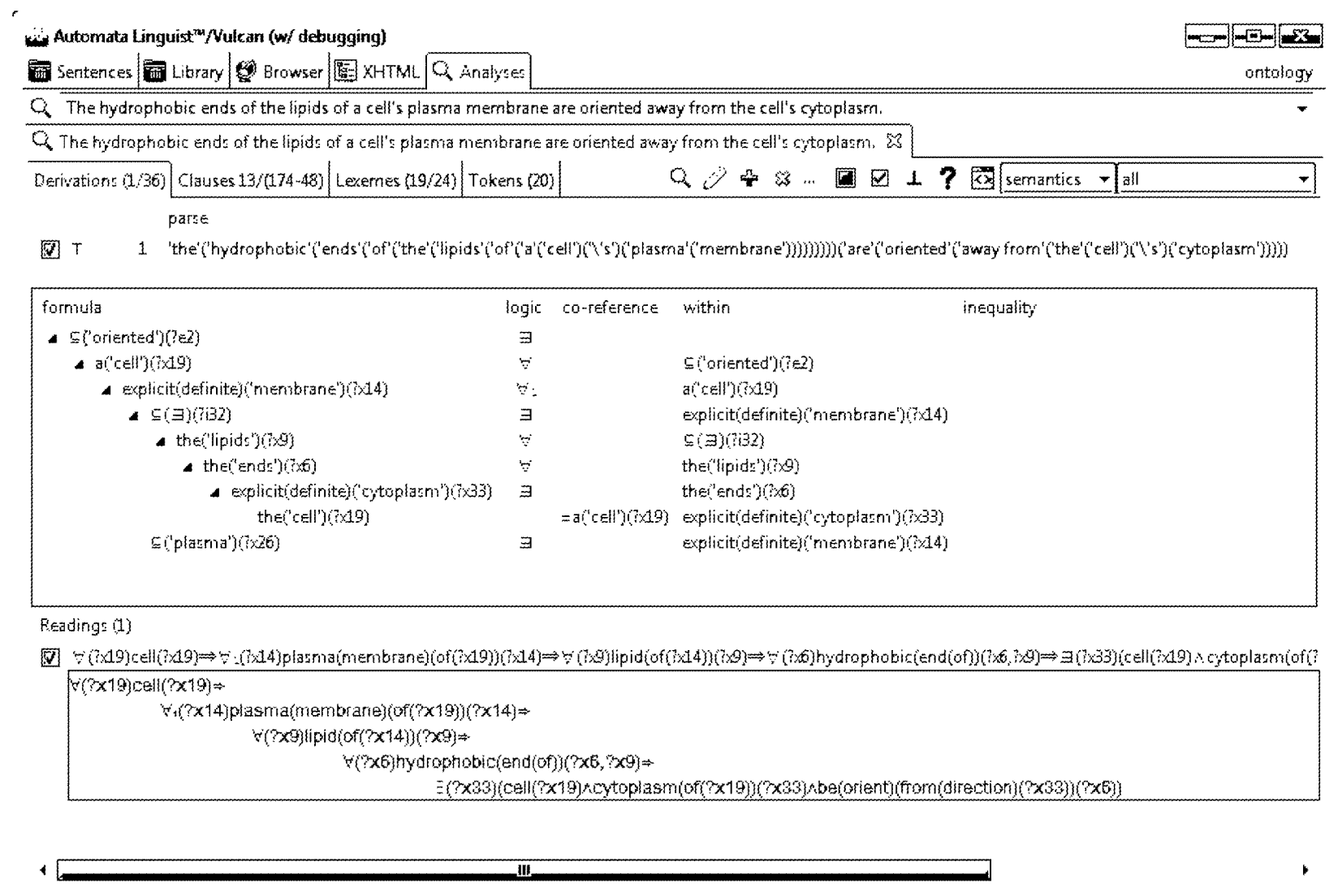

FIG. 8 illustrates the effect of specifying an equality, clarifying several quantifiers as universal, and selecting a reading from those that were consistent with such specifications. Note the singular universal quantification indicates an implication unlike existential quantification, as discussed above. The depicted sentence has been reduced to the point of a single axiom. Upon closing the tab for this sentence within the user interface, the XML document for the sentence is updated in the knowledge base and propagated to other clients of the knowledge base as being axiomatic and last acted upon at the time of conclusion by the user who disambiguated the sentence.

The table of readings in FIG. 7 shows only two readings for the selected parse. This reflects conflation of formulas as discussed below and suppression of variables that are "optional", such as Davidsonian variables and variables corresponding to ellipsis (i.e., elided arguments) which are not co-referenced. Eliminating such variables from formulas also allows the quantifying formulations that introduce them to be omitted from readings, thereby reducing the number of readings by eliminating ambiguity with regard to relative scope. Typically, when the present invention drops an elided argument it typically uses a related predicated. For example, in the case of transitive nouns or adjectives used intransitively, predicates often include an ending preposition, such as "end(of)" as shown in FIG. 6. When the present invention suppresses an elided transitive argument from a formula the resulting formula uses the related transitive predicate, such as "end". Similar logic is brought to bear for verbal predicates that expect prepositional complements, as discussed further below.

Figure 11:
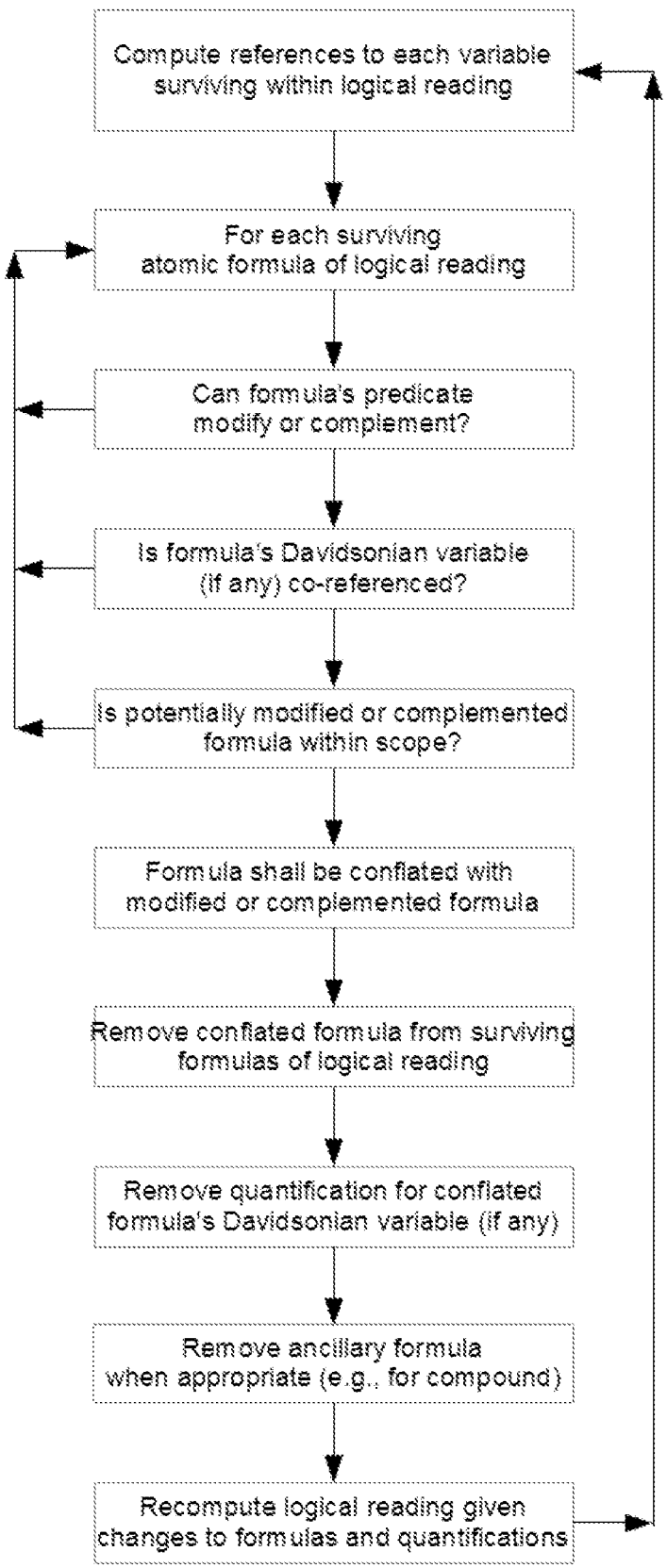
FIG. 11 is a diagram of a process by which formulas are conflated in a preferred embodiment in accordance with the system of the present invention.

The present invention simplifies logical disambiguation and facilitates optimized reasoning performance when the logic resulting from such disambiguation is used with logic programming systems by composing predicates and conflating atomic formulas as shown in FIG. 11. The readings of FIG. 7 demonstrate the effect of conflating compounds, modifiers, and complements using "phrasal style" and "existential functors" as reflected in the selection of "all" in the combo box at the right of the toolbar in FIG. 7.

Figure 9:
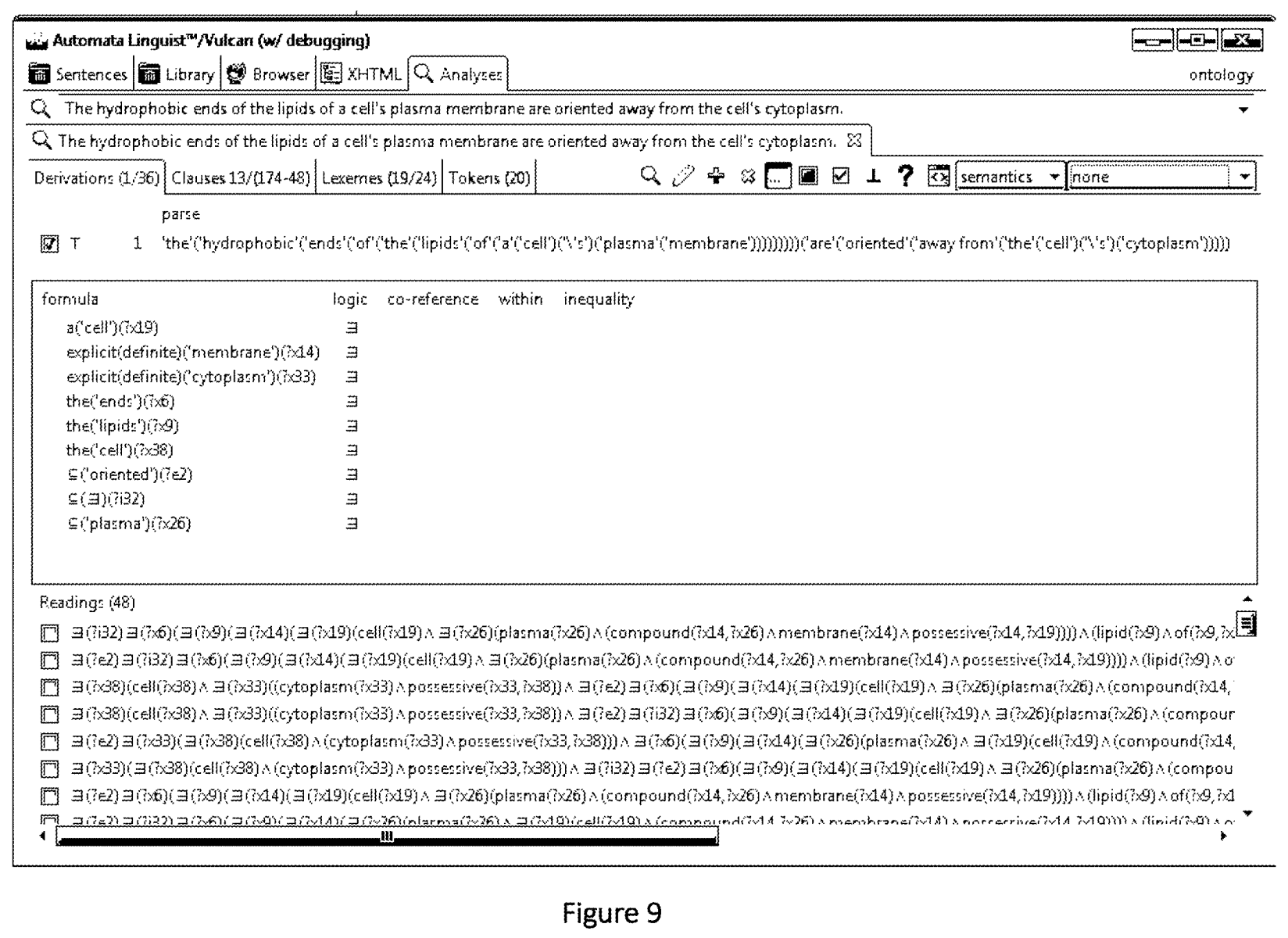
Figure 10:
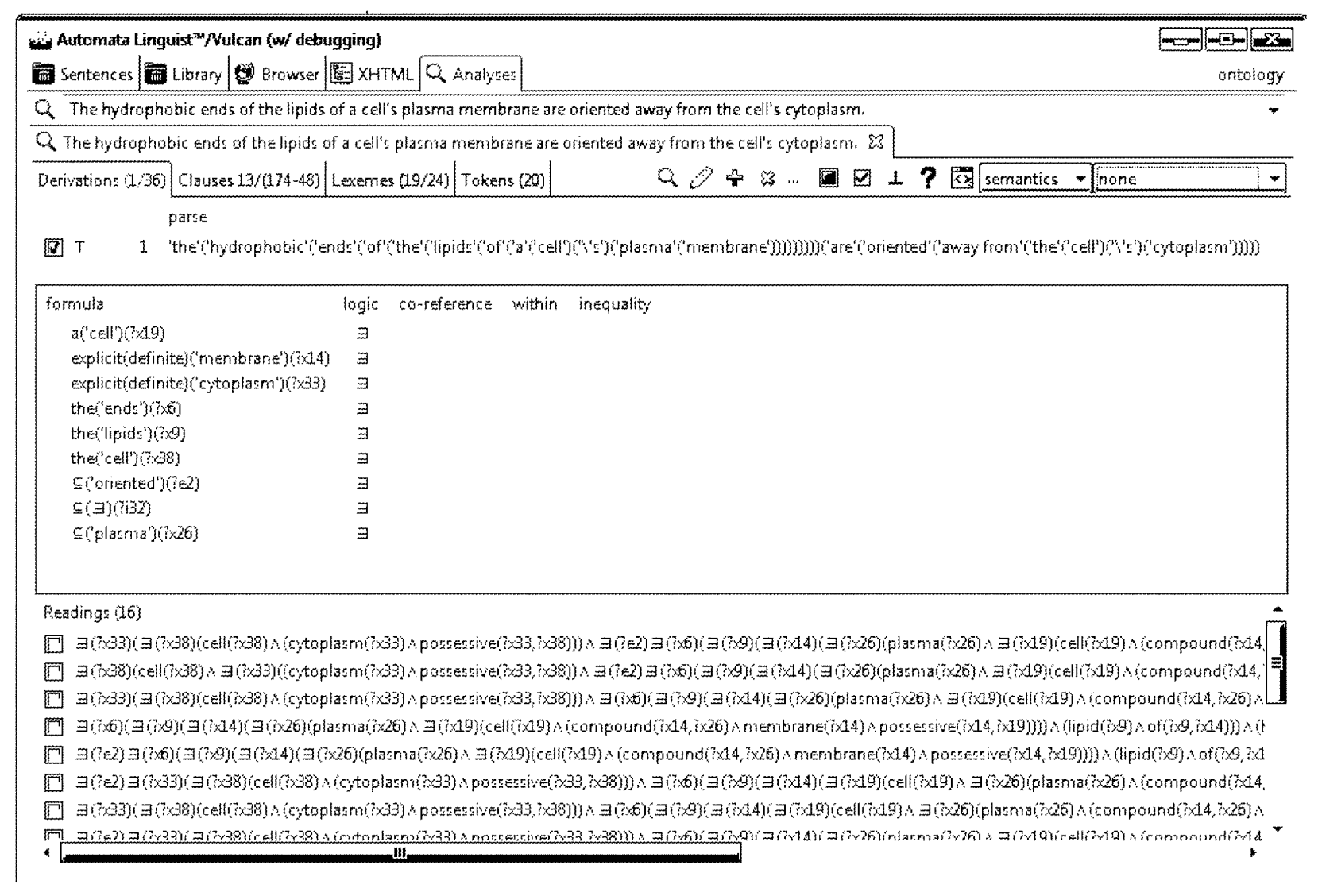

FIG. 9 shows that the number of readings for a parse increases from 2 to 48 for the selected parse when no conflation is specified in the drop-down box on the right of the toolbar and without suppression of "optional" arguments specified by the " . . . " toggle near the middle of the toolbar. FIG. 10 shows 16 parses for the selected sentences with suppression of "optional" arguments but without conflation. Again, this contrasts with 2 when all conflation is in effect for the selected parse.

The present invention applies a number of transformations to conflate formulas as shown in FIG. 11. In many cases, the conflation of formulas resolves arguments elided from other formulas. For example, if a parse expects a prepositional complement that is not recognized by the NLP system, it may produce two formulas, one representing the link between the head of a prepositional phrase with the variable it complements and another for the clauses headed by the verb with an elided argument for its unrecognized but expected complement. In the event the predicate of the prepositional formula is compatible with the expected complement the prepositional two formulas can be conflated. The most common case for such conflation of formulas resolving elided arguments is to resolve omitted "of" complements, however.

Conflation resolves "of" complement arguments elided within formulas when the prepositional formula (whether for "of" or a possessive construction) occurs within the same scope of quantification and negation. For example, "a part attached to its assembly" will produce a transitive "part(of)" predicate with an elided argument (i.e., a variable that is not referenced in any other formula) and a "possessive" predicate with a un-referenced variable for the pronoun. For logical readings in which these two predicates are within the same scope of quantification and negation, they may be conflated. In performing this conflation, the predicate "part (of)(?part,?)" and "possessive(?its,?assembly)" become "part(of)"(?part,?assembly)" where question marks indicate variables with or without a name. Note, however, that such conflation would be possible only after an equality between 'its' refers to the "part" such as using the co-reference capabilities discussed above. Also note that this example may be viewed as suppression plus more general conflation.

In the event that the elided variable in the example above is suppressed, as discussed above, "part(of)(?part,?)" becomes "part(part)". This is equivalent to the result from parsing a word that is not a partitive or transitive and allow it to be complemented, as is typically the case for nouns and verbs. In this case, conflation of a complement proceeds with its more general definition. Conflation of a complement involves the composition of a predicate and the addition of an argument. Furthermore should not proceed arbitrarily but be done in accordance with a methodology in order for resulting logic to be effective. In the example of "part (?part)" and "possessive(?its,?assembly), the latter effectively becomes "possessive(?part;?assembly)" after resolving pronomial anaphora. Ina preferred embodiment where conflation is performed using "phrasal style", the result will be part(of(?assembly))(?part). In another preferred embodiment, conflation results in "part(of)(?part,?assembly)". Note that in each case, the possessive is treated as a special case of "of".

Note that we have omitted Davidsonian arguments for simplicity in the prior and following paragraphs.

In a preferred embodiment, the methodology of conflation for complements is to append complementing predicates to the predicates they use. In such a preferred embodiment, the complementing predicate should be appended in a manner that can be decomposed at runtime and ontological information about predicates resulting from such conflation may be made available for use by logic programming technology. For example, in a preferred embodiment, the conflated predicate is defined within an ontology identifying the conflated predicating and how it comprises the complemented and complementing predicates. Such information is subsequently made available as declarative statements.

For example, the following show the declaration of compositional predicates and related logic produced by a preferred embodiment of the present invention,
1. rdfs:subPropertyOf(assembly(of),of)
2. rdfs:domain(assembly(of),assembly)
3. forall(?x)^(assembly(?x)<==>exist(?y)^assembly(of) (?x,?y))
4. forall(?x,?y)^(assembly(of)(?x,?y)<==>(assembly(?x) and of(?x,?y))

These axioms relate the unary nominal to its binary transitive form in web ontology language and first order logic (using SILK syntax).

Conflation of modifiers, which typically (ignoring Davidsonian arguments) do not have arguments other than what they modify, is similar although in a preferred embodiment, the modifiers by default compose as a prefix "around" what they modify. For example, in "a red ball", the predicates "red(?ball)" and "ball(?ball)" compose into "red(ball)(?ball) ".

As in the case of conflation of complements, a preferred embodiment maintains an ontology of information concerning predicates composed during conflation and which is the complementing or modifying predicate as well as which is the complemented or modified predicate. Also, as discussed above in the case of complements, a preferred embodiment provides information for external use, such as during reasoning by a logic program. For example, the following axioms might be provided:
1. composition(red(ball),ball,red);
2. red(ball)(?ball)<==>(red(?ball),ball(?ball));

The first of which is a declarative representation as a Prolog fact suitable for processing using HiLog axioms written in SILK. For example, the $2^{nd}$ axiom above is implied by the following HiLog axiom given the first, as in a preferred embodiment:
?modifies(?modified)<==>(?modifies(?x),?modified(?x))
:-
composition(?modifies(?modified),?modified,?modifies), unary(?modified),unary(?modifies);

Where axiom 1 above corresponds to the head (preceding the "is implied by" sign :-) and axiom 2 above unifies with the first atomic formula of the body and provided "red" and "ball" are unary predicates.

Note that some post-modifiers may be composed as in ?modified(?modifies). More importantly, note that composition can proceed through multiple levels. For example, consider the following predicates from FIG. 8:
1. plasma(membrane)
2. lipid(of(?))
3. hydrophobic(end(of(?)))
4. be(orient)(away(from))

The occurrences of "(?)" indicate arguments of complements composed using phrasal style. Such predicates are easier for people to read. They are easily supported by logic programming systems such as Prolog, for example, with axioms like:

lipid(of)(?membrane,?lipid):-lipid(of(?membrane))
(?lipid)

Note, importantly, that conflation must consider referenced Davidsonian variables. If the Davidsonian variable of a modifier or complement is reference it cannot be conflated with what it modifies or complements since doing so eliminates the Davidsonian variable as shown above. In practice this has little effect if the conflation process is defined to proceed in a bottom-up or opportunistic manner. For example, if the modifier or complement that reference a Davidsonian variable of its modified or complemented formula (as is typical case by which such modification or complementing is recognized) is conflated with said modified or complemented formula, it is frequently the case that no other reference to said modified or complemented formula then exists such that the resulting formula, with a composed predicated, may now proceed to be conflated with what it modifies or complements.

As an example of compound conflation, consider the sentence, "Most secretory proteins are glycoproteins, proteins that are covalently bonded to carbohydrates." Logic resulting for this sentence involves the "be(covalent(bond))(to(?))". To obtain this result, the system conflated the "covalent" modifier with "be(bond)" and the result was conflated with a "to" complement. In the preceding, note the use of the adjectival lemma for the deadjectival adverb applied to the verb.

The predicate "be(bond)" of the prior paragraph demonstrates another form of conflation supported by the present invention. The NLP system produced a predicate with an unresolved subject using the verb "bond" and noted that it was used in passive voice. The present invention generally refuses to suppress elided arguments when they are a core argument of their predicate, as is the case for the subject of a verb. In passive constructions, however, the subject argument is frequently elided. Generally, however, suppressing elided arguments is limited to dropping final elided arguments (unless there is more complex information concerning a related predicate having the same arguments except for the elided argument). In the case of passive constructions with elided arguments, the convention used in the present invention is to compose the predicate along the following lines:
1. be(?infinitive)(?object)<==>(?infinitive(?subject,?object,?complement)
   :-
   passive(be(?infinitive),?infinitive), SVOC(?infinitive)

Where, again, Davidsonian variables are omitted for simplicity and SVOC denotes the typical pattern of a verb of valence 3 consistent of a subject, object, and complement, in that order, when used in active voice.

Returning to the composition of "be(covalent(bond))(to)" from above, the compositional machinery considers that "be(bond)" is an argument pattern composition rather than a predicate resulting from modification or complementing. Thus, the conflationary algorithm penetrates the "be(bond)" to perform modification on the active form.

An important special case of conflation of modifiers concerns compound words. In the case of "plasma membrane" in the sentence of FIG. 10, the NLP system produces a quantifier for each of "plasma" and "membrane". Unlike most modifiers, this yields an extra variable to be carried through modification, as in producing a predicate "plasma (?p)(membrane(?m))" instead of "plasma(membrane)(?m)". In most cases of compounds, however, the variable of the modifier lacks co-reference. In the present invention, if conflation of compounds is permitted, as in the case of FIG. 6 above, compounds with non-head arguments that lack co-reference are treated as modifiers without the non-head argument. Note the impact that conflation of compounds has on readability (i.e., ease of use and disambiguation productivity):

$\forall(?x6)\exists(?x8)(channel(?x8)\land compound(?x6,?x8)$
$\land protein(?x6)) \Rightarrow protein(?x6)\land transmembrane(?x6)$
$\forall(?x15)channel(protein)(?x15) \Rightarrow transmembrane(protein)(?x15)$ Also note the elimination of a quantifier which simplifies scope disambiguation and reduces the number of readings.

The part modifying the head of a compound stands in some underlying logical relation to the head. For example, a "storage disease" is a "disease affecting storage", a "channel protein" is a "protein with a channel", and a "cell membrane" is a "membrane [that is part] of a cell". In the present invention, compounds trigger additional knowledge acquisition activity. Even without additional knowledge about the relationship underlying a compound, however, the present invention supports the inference that satisfying a compound implies satisfying the head predicate, as in the following SILK:

?head(?x)<==?modifier(?head)(?x)
:-
compound(predicate)(?modifier(?head));

Which corresponds to Prolog including the following:
1. membrane(?m):-plasma(membrane)(?m);
2. compound(predicate(plasma(membrane));

As introduced above, existential functors are another kind of conflation. Unlike other forms of conflation, in which two formulas become one, frequently eliminating a quantifier, existential functors are terms conflating a quantifying formula with the only atomic formula that references the variable said quantification introduces. The result of such conflation is a term which may be considered as a skolem in traditional logic programming.

For example, the following shows the effect of conflation for the sentence, "All organisms have cell membranes".

$\forall(?x6)organism(?x6) \Rightarrow \exists(?x8)(\exists(?x13)cell(?x13)$
$\land compound(?x8,?x13)\land membrane(?x8))\land have(?x6,?x8))$
$\forall(?x6)organism(?x6) \Rightarrow have(?x6,\exists(cell(membrane)))$ Reading this sentence is significantly easier because there is no need to trace a variable to a quantifier and another atomic formula. The logical effect of such conflation is to bring the quantification of a variable to its smallest scope. Although such conflation may not have the intended semantics, it has proven useful and productive during disambiguation. In the example above, the existential is appropriately narrow. If the intended semantics was to say that there exists an individual cell membrane that is common to all organism, however, the scope of the existential should include the universal. Consequently, the present invention allows conflation of quantifiers to be toggled on and off, so as to verify or clarify all scopes finally. In practice cases, however, the intended semantics is typically for existential scope to be narrow with respect to universal quantification and the order of nested of existential quantification has no effect on logical semantics unless a non-existential non-atomic formula intervenes.

In its most aggressive conflationary configuration, the present invention may also conflate universal quantifiers as for existential functors discussed above. That is, if the variable for a universal quantification is referenced only once, that reference can be rendered as a term. For example, after conflating the existential above, the resulting universal quantification is referenced only once and may be conflated as follows:

$\forall(?x6)$organism$(?x6) \Rightarrow$have$(?x6,\exists($cell$($membrane$)))$
have$(\forall($organism$),\exists($cell$($membrane$)))$ Note the result includes no variables. This corresponds to sentence of description logic, such as:

rdfs:subClassOf(organism,owl:someValuesFrom(have, cell(membrane)))

That is, the quantifiers of description logic are implicit so as to preclude explicit variable references. By resolving quantifiers using equality and conflating atomic formulas where possible and allowed, the present invention effectively translates many sentences of natural language into description logic.

Transitive verbs are frequently used in passive voice and ergative verbs used intransitively replace their semantic subject with their direct object. In such cases, the subject is frequently omitted from the sentence. The present invention automatically defines passive predicates within its lexical ontology and supports reasoning with them versus their transitive counterparts.

For example, consider the sentence, "Proteins are embedded in the phospholipid bilayer." There is no syntactic subject or semantic agent of the verb "embedded" in this sentence. Consequently, NLP produces parses in which proteins constitute an argument of an underlying predicate which is missing its subject argument. In addition, NLP typically produces an additional predicate indicate the passive construction. In this case, NLP also produces a predicate indicating that the prepositional phrase using "in" is complements the predicate for "embed".

Rather than producing a quantifier for the missing subject, the present invention conflates the passive indicating predicate with the verbal predicate when the subject is omitted in such cases, as shown below:

$\forall(?x10)\exists(?x16)($phospholipid$(?x16)\wedge$compound$(?x10, ?x16)\wedge$bilayer$(?x10)) \Rightarrow \exists(?e2)\exists(?x5)($protein$(?x5)\wedge$in$(?e2,?x10)\wedge$be$($embed$)(?e2)(?x5))$ In addition, the present invention typically conflates the prepositional complement with the verbal predicate and also conflating the compound, as discussed above, yielding in this case:

$\forall(?x10)$phospholipid$($bilayer$)(?x10) \Rightarrow \exists(?x5)($protein$(?x5)\wedge$be$($embed$)($in$(?x10))(?x5))$ And, if permitted to conflate quantifiers that introduce variables referenced only once, further conflates this into:

be(embed)(in($\forall$(phospholipid(bilayer))))($\exists$(protein))

which corresponds to a sentence of description logic, such as the following which may be generated by the present invention depending on the target reasoning system (e.g., for an OWL-DL reasoner):

rdfs:subClassOf(phospholipid(bilayer),owl:someValuesFrom(be(embed)(in),protein))

The present invention also supports reasoning with such ontological representation by generating supporting axioms, such as:

embed(in)(?e)(?y,?z,?x)<==>(embed(?e)(?y,?z),in(?e)(?z,?x)))

Where the variable "e" is a Davidsonian variable which may be omitted, as in:

embed(in)(?y,?z,?x)<==>(embed(?y,?z),in(?z,?x)))

While each of suppression and conflation reduce the number of readings significantly, in combination their effect can be dramatic. In both cases the reduction in the number of readings results from a elimination of quantifying formulations and ambiguities of the scope relative to other quantifiers. Conflation is particularly effective in reducing the complexity of individual readings as reflected in the relative widths of the horizontal scroll bars in FIG. 9 versus FIG. 7.

As another example, the following demonstrates the effect of various forms of such conflation for the interrogative sentence "If a Paramecium swims from a hypotonic environment to an isotonic environment, will its contractile vacuole become more active?".

$\forall(?x13)$environment$(?x13)\wedge$hypotonic$(?x13)$
$\Rightarrow \forall(?x20)$environment$(?x20)\wedge$isotonic$(?x20)$
$\Rightarrow \forall(?x9)$paramecium$(?x9)$
$\Rightarrow \forall_1(?x29)$possessive$(?x29,?x9)\wedge$contractile$(?x29)$
$\wedge$vacuole$(?x29)$
$\Rightarrow$if(then)(become(identical)$(?x29,\exists(?e43)$more$(?e43)$
$\wedge$active$(?e43)(?x29))$,
$\forall(?e12)$from$(?e12,?x13)\wedge$to$(?e12,?x20)\wedge$swim$(?e12)$
$(?x9))$
$\forall(?x9)$paramecium$(?x9)$
$\Rightarrow \forall_1(?x29)$contractile$($vacuole$)($of$(?x9))(?x29)$
$\Rightarrow$if(then)(become(identical)$(?x29,$more$($active$)$
$(?x29))$,
swim(from($\forall$(hypotonic(environment))))(to($\forall$(isotonic(environment))))(?x9))

The number of atomic formulas is reduced by more than half and the number of variables with scope to be resolved is reduced by two thirds while the number of readings falls from several hundred to less than ten.

The present invention improves upon the disambiguation of semantics by discriminating among formulas rather than being limited to finer-grain structure. Discriminants include tuples corresponding to predicates and their arguments rather than just discriminants per argument. Such tuples are illustrated in FIGS. 5 and 14, for example. The net effect is to make choices easier to comprehend for most users and to reduce incorrect disambiguation steps. Simply put, presenting formulas provides more context and reduces technical linguist details. It also anticipates logical disambiguation by providing a more uniform perspective than finer-grain perspectives.

The present invention presents different views of discriminants. In FIG. 14, for example, the default configuration of focusing on semantic tuples is reflected in the combo-box next to the rightmost on the toolbar. Users may examine all discriminants that are consistent with the parse in focus, such as by selecting a parse as in the uppermost table of FIG. 7. Alternatively, if a sentence is grammatically unambiguous, such as indicated by the checked and only parse in the same table shown in FIG. 8, the tab labelled "clauses" will contain all the discriminants that are consistent with the parse and indicate which have been explicitly affirmed by disambiguators. In addition, the "clauses" tab will also indicate any discriminants that have been refuted by disambiguators.

Other views of discriminants focus on lexical or syntactic ambiguities. Focusing on lexical ambiguities requires the least skill and may be done quickly in a workflow between collaborators using the real-time propagation of work discussed above and reflected in FIGS. 2 and 13. As discussed above, the syntactic perspective may be focused in a bottom-up manner, such as by affirming constituent noun phrases before presenting discriminants that depend on them. As with lexical disambiguation, less skill is required than for semantic disambiguation and workflow between disambiguators of differing skill, interest, or focus is supported by the architecture of FIG. 2 and the workflows depicted in FIGS. 2 and 3. In any case, disambiguation using the default focus on semantics has proven to be easily and quickly mastered without requiring significant linguistic or logical expertise. And in each case, focusing on a subset of discriminants reduces cognitive load and increases productivity versus presenting all discriminants. For example, in FIG. 14, the caption of the clauses tab indicates that of 111 discriminants, 55 of which participate in all 75 parses shown in the sentences tab, only 19 are presented when focusing on semantics. It is rare that more than a handful of selections are required to fully disambiguate even moderately long sentences, such as depicted in the Figure.

Note that large numbers of syntactic discriminants are possible. As discussed above, the present invention suppresses syntactic constructions that are peculiar to an underlying NLP system. Nonetheless, as first discussed above, there may be many syntactic parses for a sentence or partial spans of its text. Aside from the lexical ambiguity of tokens and their parts of speech, ambiguities in the attachment or inclusion of phrases or clauses with respect to each other as well as ambiguity in the scope of linguistic connectives result in syntactic ambiguity that is combinatoric with respect to the number of lexemes in a sentences. Syntactic ambiguity is further compounded by lexical ambiguities.

The present invention reduces the impact of lexical ambiguity as part of determining syntactic discriminants. The noun phrase "the concentration" given lexical entries for mental and chemical senses of concentration will produce two distinct noun phrases. In the present invention, only one discriminant, "NP(the(concentration))" would be presented, avoiding an explosion of distinct discriminants that depend on two that would be otherwise presented. As the nesting of modifiers, complements, phrases, and clauses increases the combinatorics are significant. And avoiding such combinatorics is not as simple as presenting coarsely labeled parse trees. The method for constructing syntactic discriminants intentionally avoid the variety of non-terminals that may exist in various NLP systems, including derivational nodes as may exist between the verb "concentrate" and the noun "concentration" in even this simple case.

The present invention improves syntactic disambiguation using bottom-up disambiguation which further extends its utility to large vocabulary, broad coverage NLP systems. The present invention suppresses longer and more linguistically sophisticated types of phrases and clauses, at least until shorter, simpler choices have advanced disambiguation. For example, phrases or clauses that have a noun phrase as one of their constituents may be suppressed from presentation until the constituent noun phrase is affirmed through disambiguation.

The present invention allows choices that appear to contradict the results of NLP. For example, if all parses considered during disambiguation imply a given choice, prior systems suppress (i.e., do not present) such choices since in such systems they would not further disambiguation. Such systems are based on the premise that exhaustive parsing has taken place off-line while the present system may iterate with NLP for various reasons described above. This assumption is reflected in the more basic and limited algorithms used in such approaches to discrimination. For example, assuming that there are no plausible parses beyond those presently under consideration allows for positive inferences that may be unfounded, such as considering a discriminant inconsistent if it represents a phrase that does not occur among the presently considered parses. Although the present invention may operate under such an assumption of completeness, it is not limited to doing so. In particular, the present invention can discriminate even when there are no full parses or, more importantly, when the number of plausible parses may be astronomical, such as in the case of statistical parsers.

The present invention may also present discriminants that are implied by previously specified discriminants rather than suppress them since they would not further discrimination under the exhaustive prior off-line NLP assumption mentioned above. In the event that such an implied discriminant is refuted, the present invention repeats NLP without require prior exhaustive parsing. In the event that exhaustive parsing produces no consistent parse, the presentation of prior affirmations and refutations may be relaxed and NLP resumed without such constraints. The system is not limited to restarting although, for practical reasons having to do with client/server architecture, that is its default mode of operation. In any case, the constraints providing during disambiguation inform and constrain NLP, allowing it to be perform in a more focused, efficient, and iterative manner. For example, if disambiguation rules out any morphological tokens or narrows the parts of speech for any lexemes, which is ubiquitously the case, such constraints are conferred to the NLP system such that it does not consider other possibilities, which reduces the combinatorics of parsing leading to improved focus and efficiency as well as improved disambiguation productivity for longer sentences which are common in uncontrolled, natural language text.

The present invention is specifically targeted to obtaining the logical semantics of input text. As such, the present invention is not limited to interpreting text as it exists in documents but with regard to the knowledge it intends to communicate. Unlike treebanking software, which aims to annotate or disambiguate text as it exists without modification, the present invention deliberately supports the reformulation of text so as to facilitate knowledge acquisition (KA). Consequently, during disambiguation, the present invention explicitly supports revisions to the input text that facilitate improved NLP, such as to overcome limitations of an underlying NLP system's grammar or lexicon or to improve the repository of sentences from the perspective of knowledge management.

At any time, the input text of a sentence undergoing disambiguation may be edited and reparsed while preserving annotations already clarified for unedited parts of the text. This is particularly important and productive with regard to sentences that contain superfluous phrases or clauses (e.g., introductory adverbials), parentheticals and rhetorical flourishes (e.g., metaphors) that have little or no bearing on the logical semantics to be captured from such content.

A preferred embodiment of the system of the present invention is specifically directed to defeasible reasoning, which include reasoning under uncertainty or default reasoning. The system provides for quantification beyond existential and universal quantification as in classical logic and facilitates abductive reasoning. For example, in the sentence "bird fly", a classical logic system would fail when also given an axiom corresponding to "penguins are birds that do not fly". Classical logic fails because of the inconsistent of a penguin being deduced as flying by one axiom and as not flying by the other. In a defeasible logic, such as Vulcan's SILK, neither conclusion would be reached precisely because of such a conflict. Despite the frailties of classical logic, prior experiments with translating natural language into logic have not discerned or grappled with the need for defeasibility but have rather focused on probabilistic reasoning with less expressive logical formalisms than predicate calculus.

The present invention may operate in either of two modes with regard to defeasibility. The system may default to defeasible interpretation of all quantifiers and/or be explicit with regard to defeasibility of a sentence of quantifier, whether specified through the user interface or assumed by default when quantifiers are introduced by certain words. For example, in the sentence "most cells have a nucleus", the universal quantifier may be assumed in most cases but allows for exceptions as are supported in the reasoning of defeasible or default logic systems. In the case of this sentence, the explicit defeasibility of the quantifier may be rendered using a superscript or by prefixing the quantifier with a sign, as in:

$$\leq \forall(?x6)\text{cell}(?x6) \Rightarrow \exists(?x8)(\text{nucleus}(?x8) \wedge \text{have}(?x6,?x8))$$

A preferred embodiment of the present invention translates natural language sentences into logical axioms that are consistent with the results of NLP, such as readings depicted in FIGS. 7, 9 and 10, but more significantly, axioms resulting from logical disambiguation as in FIG. 8, into first-order syntax for use in deductive inference. The present system generates such logic in SILK syntax, for example, with translation between any two varieties of first-order syntax being straightforward and obvious to those of ordinary skill in the art.

A more preferred embodiment of the present invention translates in such a manner with annotations added as required by a defeasible or default logic system such as SILK. Such annotations specify whether such axioms are (i) strict as in classical logic, and therefore brittle in the event of inconsistency, or (ii) defeasible, as in default logic, such that inconsistencies shall not cause logical failure or brittleness.

For example, the following shows a "tag" annotation which indicates the axiom is defeasible (not strict) in SILK:
@[tag->'Every fluid is a substance.',
parse->'every'('fluid')('is'('a'('substance'))),
words->5, parses->1, readings->, warnings->0,
creator->"pvhaley", created->"2013/03/19 18:42"]
forall(?x6)^(fluid(?x6)==>substance(?x6));

A more preferred embodiment of the present invention further translates in such a manner with annotations added to non-strict axioms so as to assist resolving inconsistencies arising during the inference performed by a defeasible or default logic system. Such annotations assisting resolution of inconsistencies include annotations with regard to priority or probability of axioms so annotated as may be supported by various target abductive, uncertain, default, or defeasible logic programming systems.

A more preferred embodiment of the present invention further so annotates axioms with information that may be used in meta-reasoning so as facilitate other logic, such as written in the target system, to ascertain the priority or probabilities or conditioned on the information provided in such annotation and axiom, whether by induction or by conflict resolution policies specified in the target system, as is traditional in defeasible or default logic programming systems which incorporate argumentation as in SILK or Courteous Logic.

For example, in addition to defeasible axiom shown above, a preferred embodiment of the present invention also outputs the following strict axiom which constitutes an annotation of the defeasible axiom as reflected in the shared attributes demarcated by the "->" symbols in each:

```
@[strict, id->'Every fluid is a substance.',
  parse->'every'('fluid')('is'('a'('substance'))),
  words->5, parses->1, readings->1, warnings->0,
  creator->"pvhaley", created->"2013/03/19 18:42"]
interpretation(
  'Every fluid is a substance.',
  syntax(
    'every'('fluid')('is'('a'('substance'))),
    ?_DET40(?_N46)(?_V66(?_DET79(?_N100))),
    [S(?_S377), NP(?_NP376), DET(?_DET40), N(?_N144), N(?_N46),
    VP(?_VP239), V(?_V66), NP(?_NP155), DET(?_DET79), N(?_N102),
    N[?_N101), N(?_N100)],
    [S(?_NP376(?_VP239)), NP(?_DET40(?_N144)), DET(?_DET40),
    N(?_N46), N(?_N46), VP(?_V66(?_NP155)), V(?_V66),
NP(?_DET79(?_N102)),
    DET(?_DET79), N(?_N101), N(?_N100),N(?_N100)],
    [?_S377, ?_NP376, ?_DET40, ?_N144, ?_N46, ?_VP239, ?_V66,
    ?_NP155, ?_DET79, ?_N102, ?_N101, ?_N100],
    [_377, _376, _40, _144, _46, _239, _66, _155, _79, _102, _101, _100]
  ),
  semantics(
    bindings(
      [?_x6, ?_x2, ?_x8],
      [_('fluid'), _('is'), _('substance')],
      [?_x6, ?_x2, ?_x6],
      [_('fluid'), _('is'), ?_x6]
    ),
    [[_3, quantifier(every)(?_x6, _5, _4), 'every'],
    [_7, nominal(fluid)(?_x6),'fluid'],
    [1, verbal(be(identical))(?_x2, ?_x6, ?_x8), 'is'],
    [_9, quantifier(a)(?_x8, _10, _11), 'a'],
```

```
    [__12,nominal(substance)(?__x8), 'substance']
    ],
    [declarative(?__x2), indicative(mood)(?__x2), (literal(?__x2),
    non(perfective)(?__x2), non(progressive)(?__x2),
    present(lense)(?__x2), referent(?__x6), referent(?__x8),
    singular(?__x6), singular(?__x8), third(person)(?__x6),
    third(person)(?__x8), universal(?__x6)
    ],
    [main(formula)(__1), main(variable)(?__x2),
    formula(within(hole))(__7, __5), formula(within(hole))(__12, __10),
    sameAs(?__x8, ?__x6)
    ],
    readings(
       [universal(?__x6)([fluid(?__x6)](universal(?__x6)([substance(?__x6)])])]
    )
  )
);
```

Such annotations allow for policies such as length-, author- or tenure-based priority, for example, which are commonly used in conflict resolution.

In an example shown above, the axiom forall(?x6)^(fluid (?x6)==>substance(?x6)); is a reading rendered in a first-order logic syntax. This axiom is further translated into a logic programming syntax which is further translated into Prolog syntax by Flora-2 for execution using the XSB system. This capability has been integrated within an embodiment of the present invention such that first-order or logic programming syntax may be output into files directly. In the course of translating first-order SILK into Flora-2, the SILK system also generates intermediate axioms which can be straightforwardly rendered as production rules for use in rule-based systems.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for facilitating interpretation of a grammatically ambiguous full sentence of uncontrolled natural language text according to a natural language grammar, the method comprising:
   a. algorithmically interpreting the full sentence of the uncontrolled natural language text by a computer system into a plurality of parses including a plurality of partial parses and a plurality of full parses according to the natural language grammar;
   b. algorithmically deriving a set of discriminants where each discriminant corresponds to a number of the partial parses;
   c. algorithmically determining whether or not each of the partial parses is consistent or inconsistent with a subset of the discriminants wherein each discriminant in the subset specifies whether it is consistent with a correct interpretation of said full sentence of the uncontrolled natural language text;
   d. algorithmically determining whether each of the discriminants:
      i. is consistent with any of the partial parses which are not inconsistent with a correct interpretation of said full sentence of the uncontrolled natural language text; or
      ii. is inconsistent with any of the partial parses which are consistent with a correct interpretation of said full sentence of the uncontrolled natural language text;
   e. enabling a user interface for specifying whether or not each of a number of the discriminants is consistent with a correct interpretation of said full sentence of the uncontrolled natural language text; and
   f. after receiving a user input specifying whether or not each of the number of the discriminants is consistent with the correct interpretation, disambiguating among the plurality of full parses.

2. The method of claim 1, wherein a partial parse is considered as inconsistent if any discriminant which corresponds to said partial parse is inconsistent.

3. The method of claim 1, wherein a partial parse is considered as:
   a. consistent if a consistent partial parse depends on it; or
   b. inconsistent if it depends on an inconsistent partial parse.

4. The method of claim 2, wherein a partial parse is considered as:
   a. consistent if a consistent partial parse depends on it; or
   b. inconsistent if it depends on an inconsistent partial parse.

5. The method of claim 1, wherein one of a pair of the partial parses that overlap but neither of which contains the other is considered inconsistent if a discriminant corresponding to the other one of the pair is consistent.

6. The method of claim 1, wherein one of a pair of discriminants that overlap but neither of which contains the other is considered inconsistent if the other discriminant of the pair is consistent.

7. The method of claim 4 wherein one of a pair of the partial parses that overlap but neither of which contains the other is considered inconsistent if a discriminant corresponding to the other one of the pair is consistent and wherein one of a pair of discriminants that overlap but neither of which contains the other is considered inconsistent if the other discriminant of the pair is consistent.

8. The method of claim 4 wherein a partial parse is considered as inconsistent if each of the partial parses which depend on it are inconsistent.

9. The method of claim 4 wherein a partial parse is considered as consistent if no other overlapping partial parse is not inconsistent.

10. The method of claim 7, wherein a partial parse is considered as inconsistent if each of the partial parses which depend on it are inconsistent and wherein a partial parse is considered as consistent if no other overlapping partial parse is not inconsistent.

11. The method of claim 4, wherein a partial parse is considered as consistent if it is the only partial parse to which a consistent discriminant corresponds that is not an inconsistent partial parse.

12. The method of claim 1, wherein the algorithmic interpretation of said full sentence of the uncontrolled natural language text involves a chart parser and wherein a number of inconsistent partial parses are pruned from a chart of said chart parser in furtherance of obtaining correct interpretations.

13. The method of claim 1, wherein the algorithmic interpretation of said full sentence of the natural language text is performed with constraints on the morphological lexical, and syntactic parts considered during said performance in furtherance of obtaining correct interpretations where such constraints are derived from the discriminants or the partial parses specified as consistent or inconsistent.

14. The method of claim 1, wherein the algorithmic interpretation of said full sentence of the uncontrolled natural language text involves a chart parser and wherein a number of inconsistent parses are pruned from a chart of said chart parser in furtherance of obtaining correct interpretations.

15. The method of claim 1, wherein the algorithmic interpretation of said full sentence of the uncontrolled natural language text is repeated with constraints on the morphological, lexical, and syntactic parts considered during said repeated interpreting in furtherance of obtaining correct interpretations where such constraints are derived from the discriminants or the partial parses specified as consistent or inconsistent.

16. A method for facilitating interpretation of a grammatically ambiguous full sentence of uncontrolled natural language text according to a natural language grammar, the method comprising:
   a. algorithmically interpreting the full sentence of the natural language text by a computer system into a plurality of parses including a plurality of partial parses and a plurality of full parses according to the natural language grammar;
   b. algorithmically deriving a set of discriminants from the parses;
   c. algorithmically determining whether or not each of the parses is consistent or inconsistent with the subset of the discriminants wherein each discriminant in the subset specifies whether it is consistent with a correct interpretation of said full sentence text of the uncontrolled natural language;
   d. algorithmically determining whether each of the discriminants:
      i. is consistent with any of the parses which are not inconsistent with a correct interpretation of said full sentence of the uncontrolled natural language text; or ii. is inconsistent with any of the parses which are consistent with a correct interpretation of said full sentence of the uncontrolled natural language text;
   e. enabling a user interface for specifying whether or not each of a number of the discriminants is consistent with a correct interpretation of said full sentence of the uncontrolled natural language text;
   f. enabling in the user interface repeated algorithmic interpretation of said full sentence of the uncontrolled natural language text constrained by any discriminants specified as consistent or inconsistent in furtherance of obtaining correct interpretations; and
   g. after receiving the repeated algorithmic interpretation in the user interface, disambiguating among the plurality of full parses.

17. A method for facilitating interpretation of a portion of natural language text, the method comprising:
   a. algorithmically interpreting the portion of natural language text by a computer system into a number of partial parses and zero or more full parses;
   b. algorithmically deriving a set of discriminants where each discriminant corresponds to a number of the partial parses;
   c. algorithmically determining whether or not each of the partial parses is consistent or inconsistent with a subset of the discriminants wherein each discriminant in the subset specifies whether it is consistent with a correct interpretation of said text, wherein one of a pair of the partial parses that overlap but neither of which is contained within the other is considered inconsistent if the unlabeled structure of the graph of dependencies limited to the overlap is not isomorphic between each of the pair and the other of the pair is consistent;
   d. algorithmically determining whether each of the discriminants:
      i. is consistent with any of the partial parses which are not inconsistent with a correct interpretation of said portion of natural language text; or
      ii. is inconsistent with any of the partial parses which are consistent with a correct interpretation of said text; and
   e. enabling a user interface for specifying whether or not each of a number of the discriminants is consistent with a correct interpretation of said text.

* * * * *